(12) United States Patent
Kawai et al.

(10) Patent No.: US 8,269,871 B2
(45) Date of Patent: Sep. 18, 2012

(54) IMAGE PICKUP APPARATUS AND METHOD OF CORRECTING A PICKED-UP IMAGE SIGNAL OF THE SAME

(75) Inventors: Tomoyuki Kawai, Miyagi (JP); Yoshinori Furuta, Miyagi (JP); Yoshiyasu Nishida, Miyagi (JP)

(73) Assignee: Fujifilm Corporation, Tokyo (JP)

(*) Notice: Subject to any disclaimer, the term of this patent is extended or adjusted under 35 U.S.C. 154(b) by 512 days.

(21) Appl. No.: 12/357,858

(22) Filed: Jan. 22, 2009

(65) Prior Publication Data

US 2009/0185061 A1    Jul. 23, 2009

(30) Foreign Application Priority Data

Jan. 23, 2008  (JP) ............... P2008-012742

(51) Int. Cl.
*H04N 5/335* (2011.01)
*H04N 9/64* (2006.01)
(52) U.S. Cl. ........................ 348/301; 348/250
(58) Field of Classification Search .......... None
See application file for complete search history.

(56) References Cited

U.S. PATENT DOCUMENTS

| | | | | |
|---|---|---|---|---|
| 7,280,141 | B1* | 10/2007 | Frank et al. | 348/243 |
| 7,479,995 | B2* | 1/2009 | Dosluoglu | 348/241 |
| 7,573,517 | B2* | 8/2009 | Shibazaki | 348/300 |
| 7,619,667 | B2* | 11/2009 | Sakai et al. | 348/243 |
| 7,619,671 | B2* | 11/2009 | Li et al. | 348/301 |
| 2004/0165101 | A1 | 8/2004 | Miyanari et al. | |
| 2005/0062865 | A1* | 3/2005 | Shibazaki | 348/300 |
| 2006/0109360 | A1 | 5/2006 | Sakai et al. | |
| 2007/0097227 | A1 | 5/2007 | Toyokawa | |
| 2007/0263105 | A1* | 11/2007 | Kano et al. | 348/241 |
| 2011/0211126 | A9* | 9/2011 | Tsukioka | 348/631 |

FOREIGN PATENT DOCUMENTS

| | | |
|---|---|---|
| JP | 6-197285 A | 7/1994 |
| JP | 2005-051697 A | 2/2005 |
| JP | 2005-217770 A | 8/2005 |
| JP | 2005-260993 A | 9/2005 |
| JP | 2005-341261 A | 12/2005 |
| JP | 2006-148512 A | 6/2006 |
| JP | 2006-222689 A | 8/2006 |
| JP | 2007-12948 A | 1/2007 |
| JP | 2007-28338 A | 2/2007 |
| JP | 2007-123414 A | 5/2007 |
| JP | 2007-281556 A | 10/2007 |

OTHER PUBLICATIONS

Japanese Office Action dated Mar. 21, 2012, issued in JP Application No. 2008-012742.

* cited by examiner

*Primary Examiner* — Luong T Nguyen
(74) *Attorney, Agent, or Firm* — Birch, Stewart, Kolasch & Birch, LLP

(57) ABSTRACT

In a method for correcting a picked-up image signal of an image pickup apparatus including: a solid-state imaging device having a plurality of pixels which are arranged in a two-dimensional array form in a surface portion of a semiconductor substrate, and an amplifier which is provided at the semiconductor substrate, and which amplifies signals that are detected by the pixels in accordance with an amount of incident light; and an image signal processing section which processes a signal output from the amplifier, each of the pixels senses light emission produced when the amplifier operates, through the semiconductor substrate to obtain a signal amount as a correction amount, and the correction amount is subtracted from a detection signal amount of the pixel which is output from the amplifier, to correct the detection amount.

60 Claims, 22 Drawing Sheets

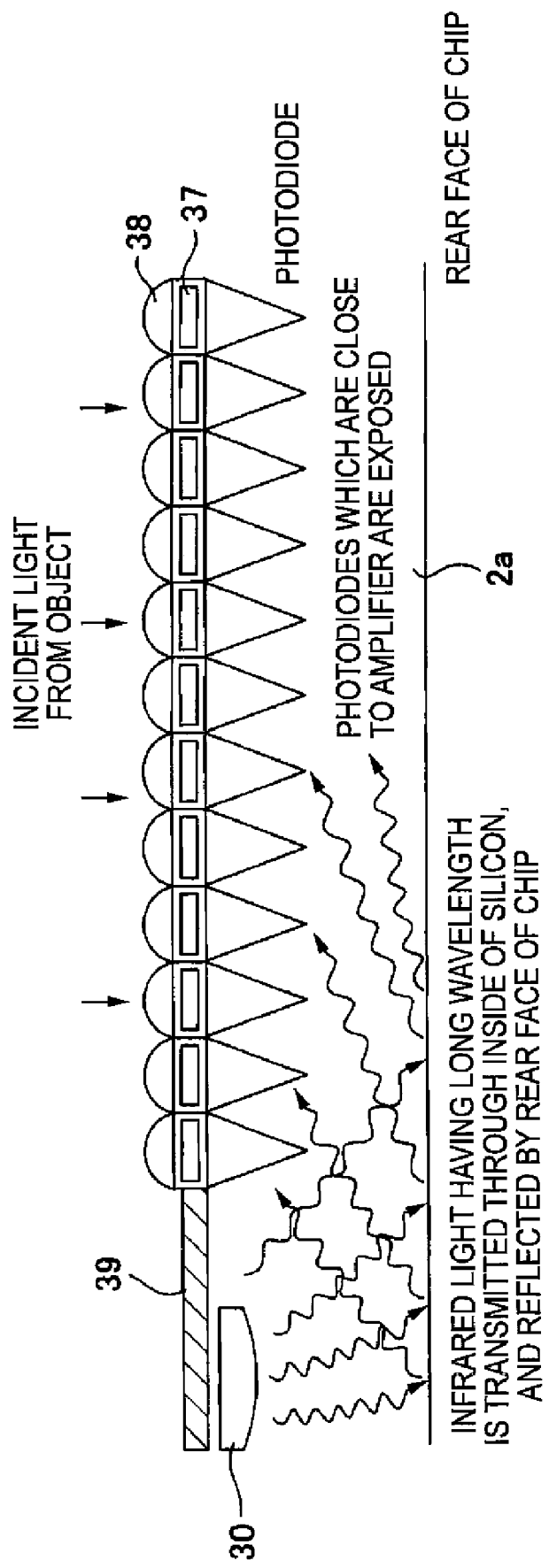

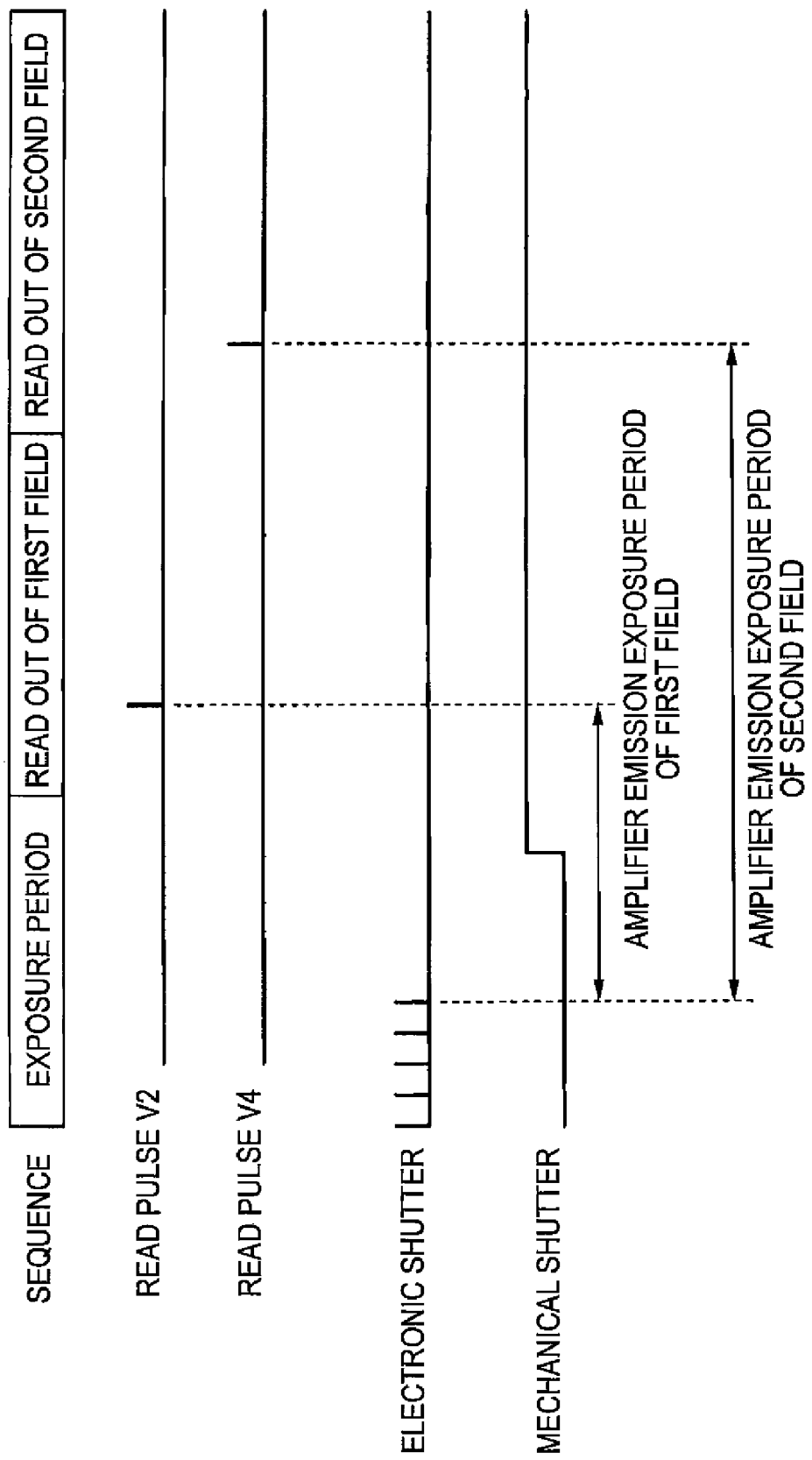

CORRECTION AMOUNT OF FIRST FIELD (A) 9-10
(B) 8-9
(C) 7-8
(D) 6-7
(E) 5-6
(F) 4-5
(G) 3-4
(H) 2-3
(I) 1-2
(J) 0-1

CORRECTION AMOUNT OF SECOND FIELD (A) 9-10
(B) 8-9
(C) 7-8
(D) 6-7
(E) 5-6
(F) 4-5
(G) 3-4
(H) 2-3
(I) 1-2
(J) 0-1

IMAGE PICKUP APPARATUS AND METHOD OF CORRECTING A PICKED-UP IMAGE SIGNAL OF THE SAME

CROSS-REFERENCE TO RELATED APPLICATIONS

This application claims the benefit of Japanese Patent Application JP 2008-012742, filed Jan. 23, 2008, the entire content of which is hereby incorporated by reference, the same as if set forth at length.

FIELD OF THE INVENTION

The present invention relates to an image pickup apparatus using a solid-state imaging device, and a method of correcting a picked-up image signal of the apparatus, and more particularly to an image pickup apparatus which is suitable for picking up a high-quality object image, and a method of correcting a picked-up image signal of the apparatus.

BACKGROUND OF THE INVENTION

For example, a CCD solid-state imaging device includes a floating diffusion amplifier in an output end portion of a horizontal charge transfer path, and outputs a picked-up image signal corresponding to the charge amount of a transferred signal charge. In the amplifier, as disclosed in JP-A-2006-148512 (paragraph [0006]) (corresponding to US2006/0109360A1 (paragraph [0009])), an impact ionization phenomenon occurs when a signal is amplified, and weak light (infrared light) is generated.

When the light emitting phenomenon occurs in the amplifier of the solid-state imaging device, the light propagates through the semiconductor substrate to expose the pixels, thereby generating noise charges.

In the case where a highly sensitive image pick-up is performed by using a solid-state imaging device, particularly, the signal charge amount which is generated in accordance with the amount of incident light from the object is small. When noise charges due to the light emitting phenomenon of an amplifier (hereinafter, the phenomenon is often referred to as the light emission from amplifier) are accumulated in pixels, therefore, the S/N ratio of a picked-up image signal is impaired, and the image quality of an object image is largely degraded.

SUMMARY OF THE INVENTION

The image quality degradation due to light emission of the amplifier can be avoided by turning off a power supply for the amplifier during exposure of the solid-state imaging device to stop the operation of the amplifier. However, exposure and an output of a picked-up image signal are concurrently performed during, for example, a process of picking up a motion picture. Therefore, the amplifier power supply cannot be turned off during the signal output, with the result that the image quality is degraded.

It is an object of the invention to provide an image pickup apparatus in which, even when the light emission from amplifier occurs, quality degradation of an object image can be avoided, and a method of correcting a picked-up image signal of the apparatus.

The method of correcting a picked-up image signal of an image pickup apparatus according to the invention is a method of correcting a picked-up image signal of an image pickup apparatus including: a solid-state imaging device having: a plurality of pixels which are arranged in a two-dimensional array form in a surface portion of a semiconductor substrate; and an amplifier which is formed in the semiconductor substrate, and which amplifies signals that are detected by the pixels in accordance with an amount of incident light; and an image signal processing section which processes a signal output from the amplifier, wherein each of the pixels senses light emission produced when the amplifier operates, through the semiconductor substrate to obtain a signal amount as a correction amount, and the correction amount is subtracted from a detection signal amount of the pixel which is output from the amplifier, to correct the detection amount.

In the method of correcting a picked-up image signal of an image pickup apparatus according to the invention, the correction amount is obtained as a value dependent on a distance between the amplifier and the pixel.

In the method of correcting a picked-up image signal of an image pickup apparatus according to the invention, the correction amount is obtained as a value which is inversely proportional to a square of the distance between the amplifier and the pixel.

In the method of correcting a picked-up image signal of an image pickup apparatus according to the invention, among the pixels, a pixel which is closest to the amplifier is set as an origin (xo, yo), and the correction amount $H(x, y)$ of another pixel $(x, y)$ with respect to the origin is obtained by $$H(x, y)=\alpha/\{(xo+x)^2+(yo+y)^2\}$$

where $\alpha$ is a parameter value.

In the method of correcting a picked-up image signal of an image pickup apparatus according to the invention, among the pixels, a pixel which is closest to the amplifier is set as an origin (xo, yo), and the correction amount $H(x, y)$ of another pixel $(x, y)$ with respect to the origin is obtained by $$H(x, y)=\alpha/\{a(xo+x)^2+b(yo+y)^2\}$$

where $\alpha$, a, and b are parameter values.

In the method of correcting a picked-up image signal of an image pickup apparatus according to the invention, among the pixels, a pixel which is closest to the amplifier is set as an origin (xo, yo), and the correction amount $H(x, y)$ of another pixel $(x, y)$ with respect to the origin is obtained by $$H(x, y)=[\alpha/\{a(xo+x)^2+b(yo+y)^2\}]-\beta$$

where $\alpha$, $\beta$, a, and b are parameter values.

In the method of correcting a picked-up image signal of an image pickup apparatus according to the invention, when the correction amount has a minus value, the correction amount is set to zero.

In the method of correcting a picked-up image signal of an image pickup apparatus according to the invention, in a solid-state imaging device in which a multi-field reading is performed, the correction amount is obtained for each field.

In the method of correcting a picked-up image signal of an image pickup apparatus according to the invention, the correction amount is obtained in accordance with a time for light emission from amplifier which is different for each field.

In the method of correcting a picked-up image signal of an image pickup apparatus according to the invention, in a solid-state imaging device in which a plurality of amplifiers exist, the correction amount is obtained for each of the amplifiers, and a value which is obtained by adding together the correction amounts for the amplifiers is subtracted from detection signal amounts of the pixels.

In the method of correcting a picked-up image signal of an image pickup apparatus according to the invention, the correction amount is calculated on the basis of a value which is obtained while operating the amplifier in a state where light is blocked from being incident on the pixels.

In the method of correcting a picked-up image signal of an image pickup apparatus according to the invention, the parameter value(s) is determined on the basis of data of a light shielded image which is obtained while operating the amplifier in a state where light is blocked from being incident on the pixels, and the correction amount H(x, y) is calculated on the basis of the parameter value(s).

In the method of correcting a picked-up image signal of an image pickup apparatus according to the invention, the parameter value(s) is obtained by using an integration value of arbitrary plural regions among the light shielded image data.

In the method of correcting a picked-up image signal of an image pickup apparatus according to the invention, as the plural regions, a first region which is closest to the amplifier, a second region which is remotest in a vertical direction with respect the first region, a third region which is remotest in a horizontal direction with respect the first region, and a fourth region which is remotest in a diagonal direction with respect the first region are used.

In the method of correcting a picked-up image signal of an image pickup apparatus according to the invention, when an average value of the light shielded image data in the first region is A, the average value in the second region is B, the average value in the third region is C, and the average value in the fourth region is D, (A−B)−(C−D) is used in calculation of the parameter value(s).

In the method of correcting a picked-up image signal of an image pickup apparatus according to the invention, in a solid-state imaging device in which a plurality of amplifiers exist, the light shielded image data are obtained for each of the amplifiers by turning on power supplies of the amplifiers one by one.

In the method of correcting a picked-up image signal of an image pickup apparatus according to the invention, the correction amount is obtained for each pickup sensitivity.

In the method of correcting a picked-up image signal of an image pickup apparatus according to the invention, the correction amount is adjusted in accordance with an exposure time.

In the method of correcting a picked-up image signal of an image pickup apparatus according to the invention, when a pickup sensitivity is equal to or higher than a predetermined sensitivity, the correction amount is obtained, and, when the pickup sensitivity is lower than the predetermined sensitivity, the correction amount is set to zero.

The image pickup apparatus according to the invention is an image pickup apparatus including: a solid-state imaging device having: a plurality of pixels which are arranged in a two-dimensional array form in a surface portion of a semiconductor substrate; and an amplifier which is formed in the semiconductor substrate, and which amplifies signals that are detected by the pixels in accordance with an amount of incident light; and an image signal processing section which processes a signal output from the amplifier, wherein the apparatus includes a correcting section which implements any one of above-described methods of correcting a picked-up image signal.

According to the invention, noises due to the light emission from amplifier are removed, and therefore a high-quality object image can be picked up.

BRIEF DESCRIPTION OF THE DRAWINGS

FIG. 3 is a diagram illustrating an influence of the weak light emission of the amplifier.

FIG. 12 is a timing chart of interlaced reading.

DESCRIPTION OF REFERENCE NUMERALS AND SIGNS

Figure 1:
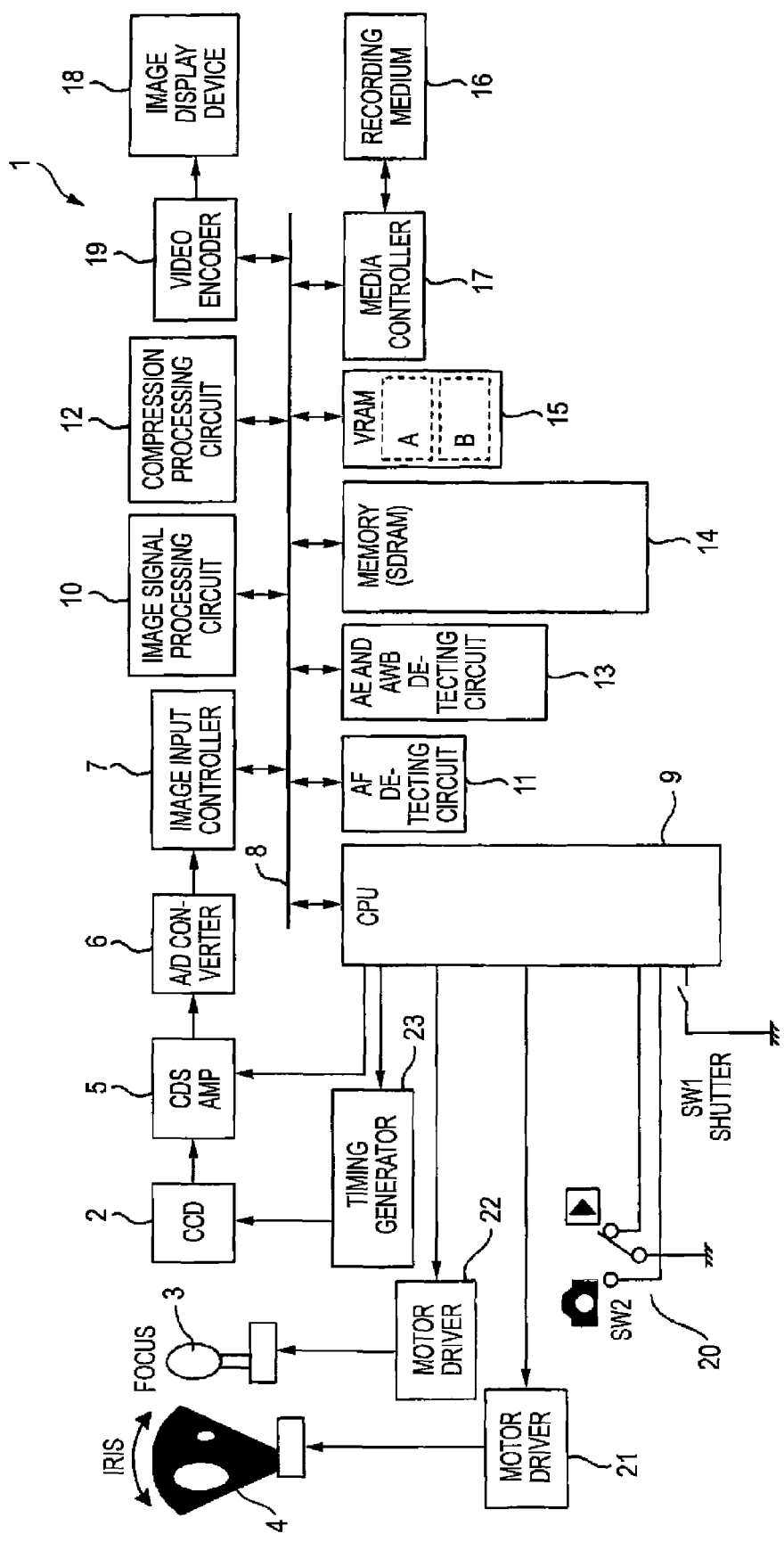
FIG. 1 is a functional block diagram of an image pickup apparatus of an embodiment of the invention.

2 CCD solid-state imaging device
9 CPU
10 image signal processing circuit
30, 30R, 30L, 30U, 30D amplifier (light emission source)
37 color filter
38 microlens 41 effective pixel region
42, 42R, 42L, 42U, 42D, 48 horizontal charge transfer path (HCCD)
43 floating diffusion portion
44 reset drain

DETAILED DESCRIPTION OF THE INVENTION

Hereinafter, an embodiment of the invention will be described with reference to the accompanying drawings.

FIG. 1 is a functional block diagram of an image pickup apparatus of an embodiment of the invention. The image pickup apparatus 1 includes: a CCD solid-state imaging device 2; an imaging lens 3 which is placed in front of the solid-state imaging device 2; an iris 4 which is placed in front of the lens; a preprocessing portion 5 which performs a correlated double sampling process (CDS) and signal amplification (AMP) on a picked-up image signal output from the solid-state imaging device 2; an A/D converting circuit 6 which converts the analog picked-up image signal that has been processed in the preprocessing portion 5, to a digital signal; and an image input controller 7 which captures an output signal of the A/D converting circuit 6.

The image input controller 7 is connected to a bus 8. A CPU 9 which controls the whole of the image pickup apparatus 1, an image signal processing circuit 10 which performs various image processes on the digital picked-up image signal, an AF detecting circuit 11 which automatically detects the focal position of the lens 3 from the digital picked-up image signal, a compressing circuit 12 which compresses the picked-up image signal that has been image-processed, into JPEG image data, MPEG image data, or the like, and an AE & AWB detecting circuit 13 which detects the exposure value and the white balance value from the digital picked-up image signal are connected to the bus 8.

An SDRAM 14 which functions as a main memory of the image pickup apparatus 1, a VRAM 15, a media controller 17 which controls writing/reading processes to be performed on an external recording medium 16, and a video encoder 19 which controls the display of an image display device 18 such as a liquid crystal display device disposed on a back face portion of the image pickup apparatus are further connected to the bus 8.

The preprocessing portion 5, and an operation switch 20 including a two-step (S1, S2) shutter release button are connected to the CPU 9. A motor driver 21 for a motor which drives the iris 4, a motor driver 22 for a motor which drives the imaging lens 3, and a timing generator 23 which drives the solid-state imaging device 2 are further connected to the CPU 9.

In the image pickup apparatus 1, the picked-up image signal output from the CCD solid-state imaging device 2 is captured by the image input controller 7 through the preprocessing portion 5 and the A/D converting circuit 6, the image signal processing circuit 10 applies various image processes on the image signal to produce object image data, and the data are stored into the recording medium 16 or displayed on the image display device 18.

In the image pickup apparatus 1 of the embodiment, during the image process, noise components which are produced by the above-described light emission from amplifier are correction-processed by the CPU 9 with using the subordinate components such as the image signal processing circuit 10 in a manner which will be described later in detail, to produce object image data from which noises due to the light emission from amplifier are removed.

Figure 2A:
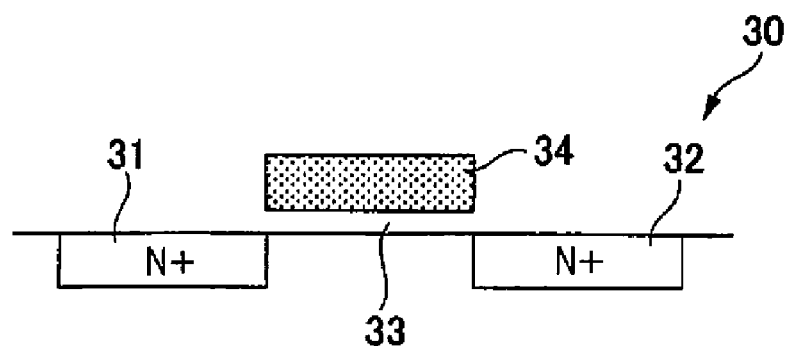
FIGS. 2A and 2B are diagrams illustrating the principle of weak light emission of an amplifier.
Figure 2B:
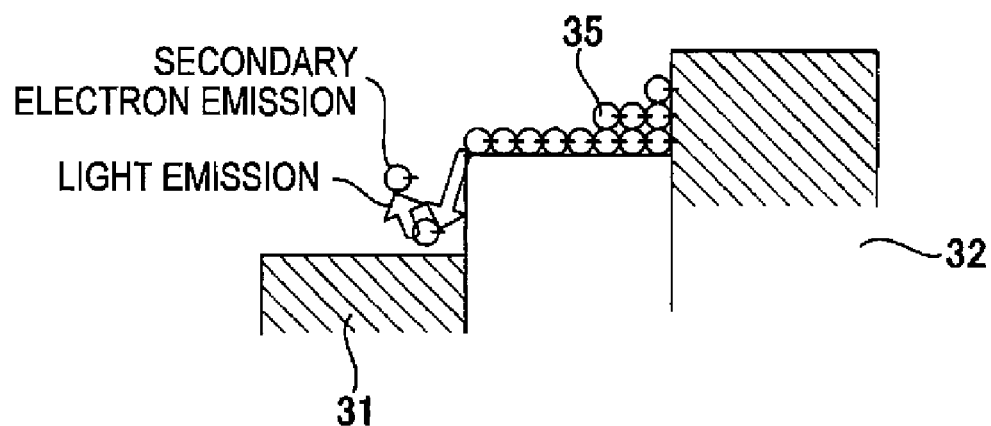

FIGS. 2A and 2B are diagrams illustrating the physical principle of the light emission of an amplifier 30. FIG. 2A is a sectional diagram of a transistor constituting the amplifier 30 formed in a semiconductor substrate. Between and above two separated N-regions 31, 32 (source, drain), a gate 34 is disposed through a gate insulating layer 33.

FIG. 2B is a potential diagram of the transistor of FIG. 2A in the case where a signal amplifying operation is performed. As illustrated, electrons 35 flow from the N-region 32 into the N-region 31 while being accelerated by a large voltage difference, and secondary electrons are then generated by impact ionization. When the electrons are charge-recombined, light emission (mainly in the infrared region) corresponding to the energy gap occurs.

FIG. 3 is a diagram showing a section of main portions of the solid-state imaging device 2. Many photodiodes are formed in a surface portion of a light receiving region of a semiconductor chip 2a. A color filter 37 and a microlens 38 are stacked on each of the photodiodes in the surface of the semiconductor chip 2a.

A region of the semiconductor chip 2a other than the light receiving region is covered by a light shielding film 39. The amplifier 30 is formed under the film. During the signal amplification, i.e., when the power supply is turned on, the amplifier 30 emits weak light. The emitted light (infrared light having a long wavelength) is caused to propagate through the semiconductor chip 2a by, for example, being reflected by the rear face of the semiconductor chip 2a, and enters the photodiodes to generate charges (noise charges).

In the image pickup apparatus 1 of the embodiment, a signal amount (correction data) which seems to correspond to the noise charges due to the light emission from amplifier is subtracted from a signal amount (original data) which is obtained from the detected charge of each photodiode, thereby producing high-quality object image data (corrected data) from which noises due to the light emission from amplifier are removed.

Figure 4:
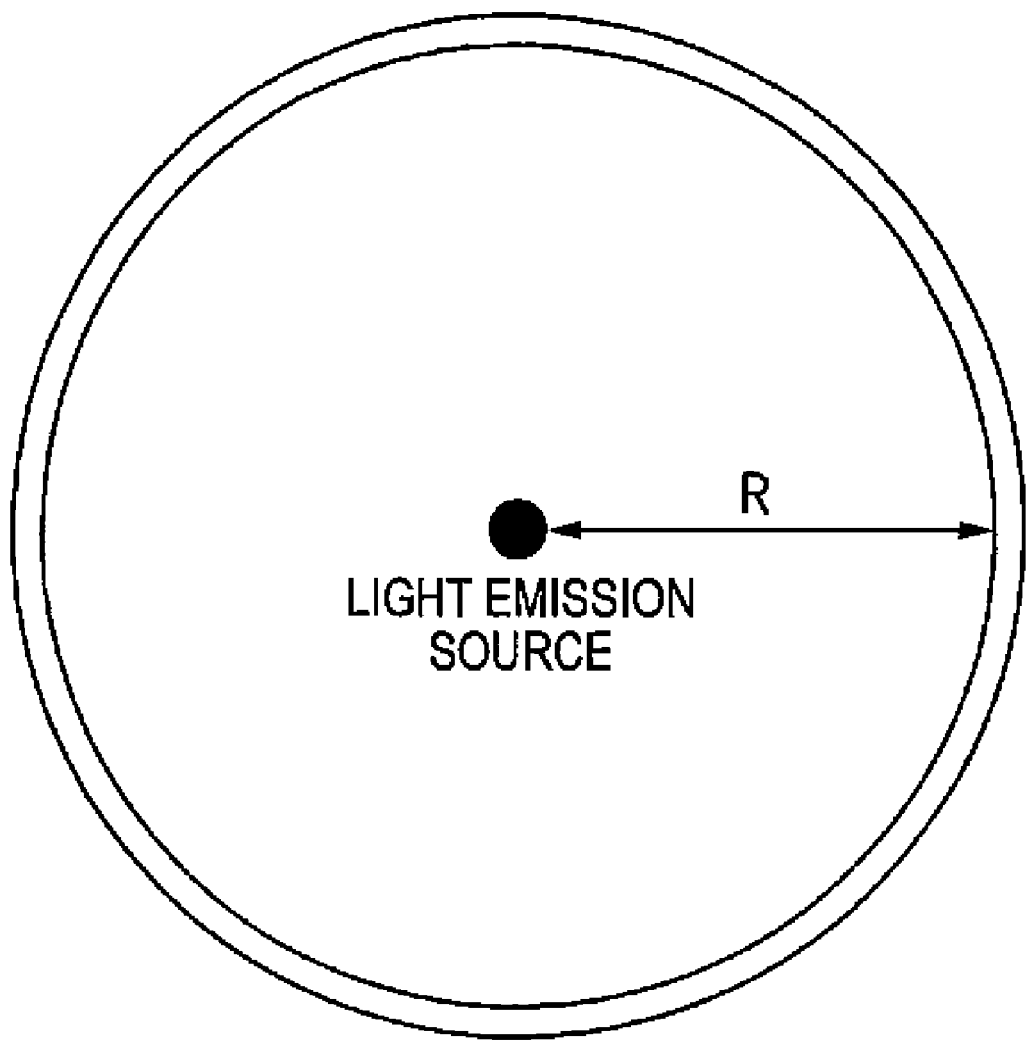
FIG. 4 is a diagram illustrating the influence of the light emission source (amplifier).

Namely, the image pickup apparatus 1 performs the correction process with setting the following expression:

corrected data $(x, y)$=[original data $(x, y)$]−[correction data $(x, y)$]

where (x, y) is the coordinates of the pixel position, to produce high-quality object image data. The light emission source is the amplifier 30. As shown in FIG. 4, the influence on a photodiode at certain coordinates (x, y) can be expressed by a function depending on the distance R from the amplifier which is the light emission source.

When the total light emission energy from the amplifier 30 which is the light emission source is indicated by L, and the light quantity energy per unit area at the distance R from the light emission source is indicated by S, the followings are obtained because the surface area of a sphere having a radius R is $4\pi \times R^2$:

$$L = S \times 4\pi \times R^2$$

$$\therefore S = L/(4\pi \times R^2)$$

$$\therefore S \propto 1/R^2.$$

Figure 5:
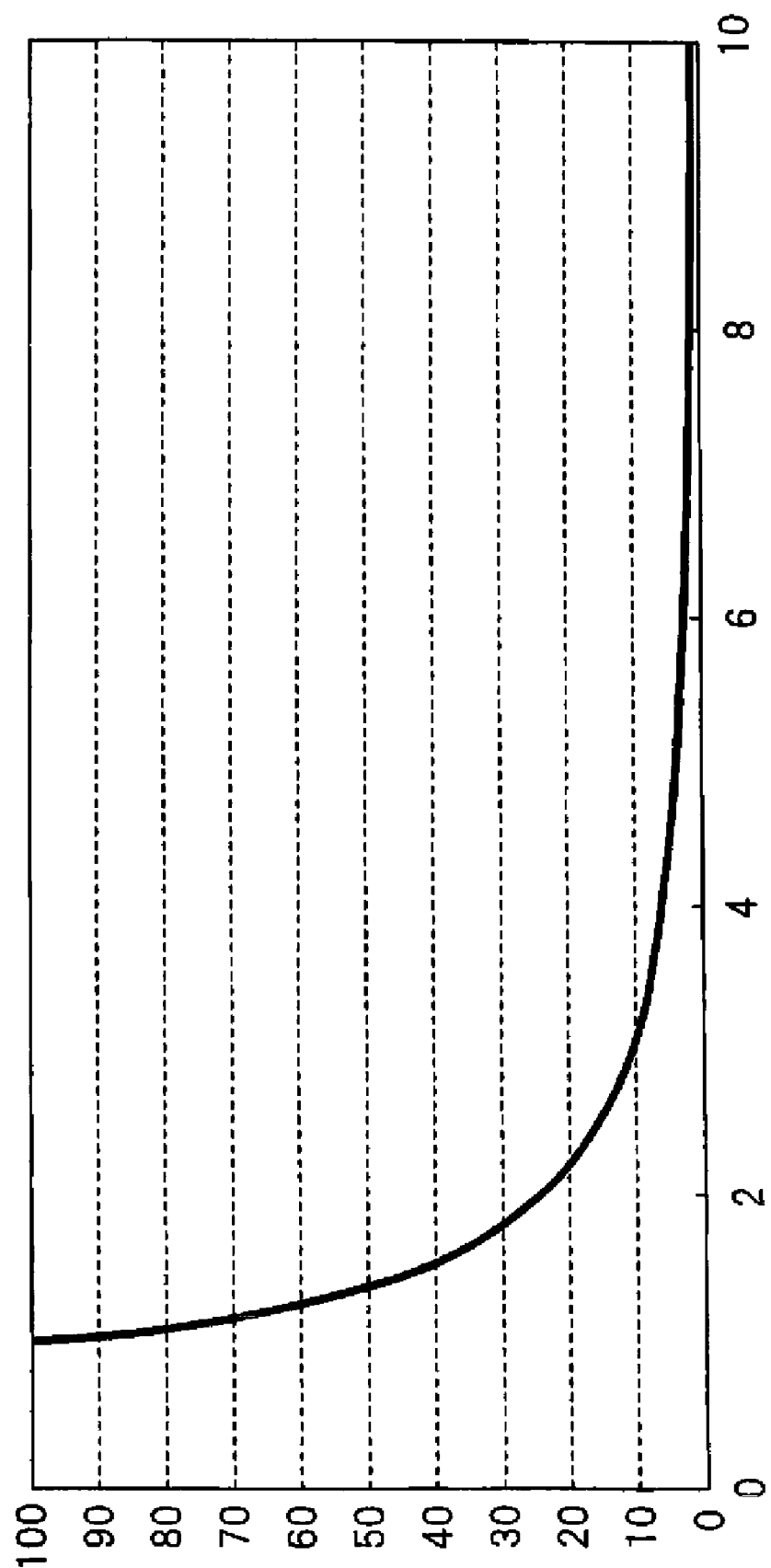
FIG. 5 is a graph showing the influence of the light emission source (amplifier).

In a certain pixel (photodiode), namely, the amount of sensitization by light emission from amplifier (hereinafter, the amount is often referred to as the amplifier sensitization amount) is inversely proportional to the square of the distance R from the amplifier. A graph of the relational expression is as shown in FIG. 5.

In the case where the correction in which the amplifier sensitization amount is subtracted from the picked-up image signal is performed, therefore, the amplifier emission amount is indicated by a function of the distance from the amplifier, and a correction amount based on the function is subtracted from the picked-up image signal, whereby the influence of the amplifier sensitization amount can be eliminated. When a correction amount which is inversely proportional to the square of the distance R is subtracted from the picked-up image signal, particularly, the correction can be effectively performed.

Figure 6:
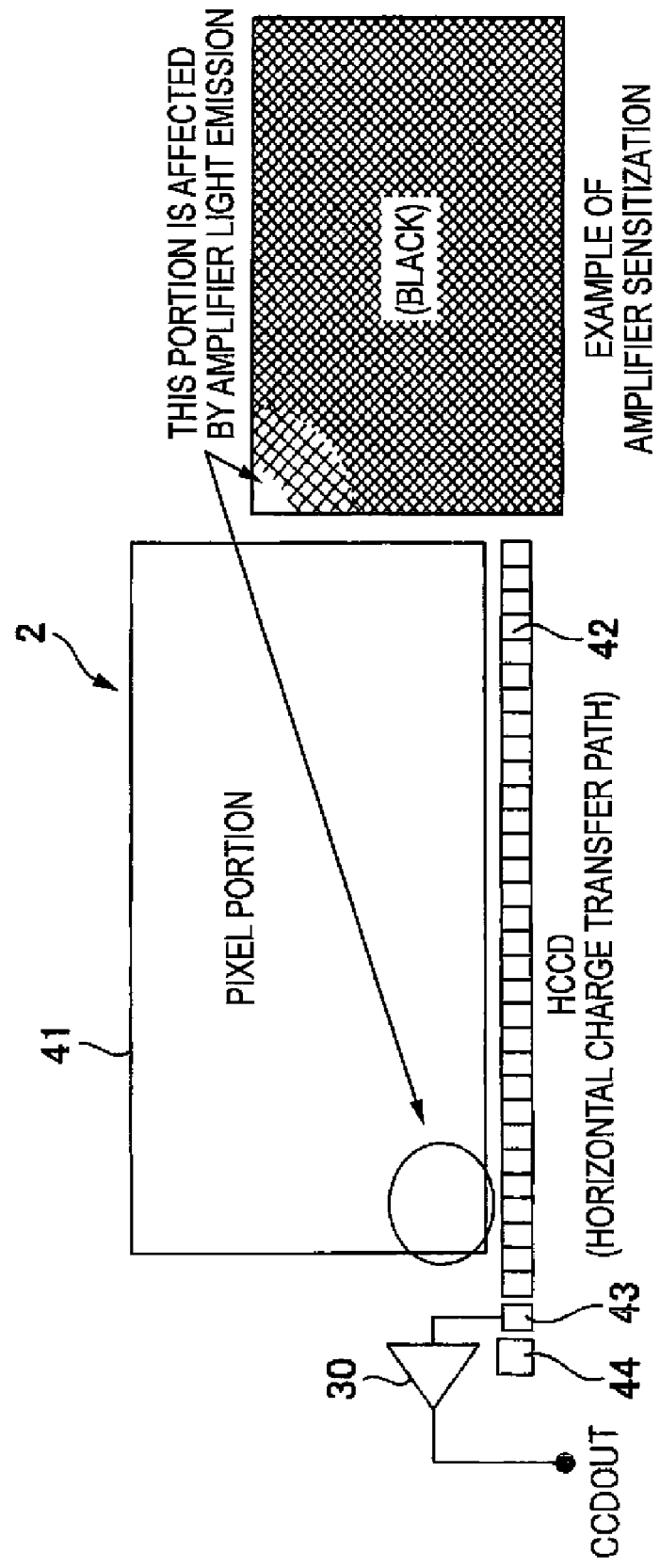
FIG. 6 is a diagram illustrating an influence of light emission from amplifier (amplifier light emission) in a CCD solid-state imaging device.

FIG. 6 is a diagram showing a surface diagram of the CCD solid-state imaging device 2 shown in FIG. 1, and an example of amplifier sensitization by the light receiving region of the device. A pixel portion 41 is disposed in the light receiving region of the CCD solid-state imaging device 2. In the pixel portion 41, a plurality of photodiodes shown in FIG. 3 are arranged in a two-dimensional array form, the color filter, the microlens, and the like are formed above each of the photodiodes, and a well-known vertical charge transfer path is disposed along each photodiode column.

A horizontal charge transfer path 42 for output is disposed along transfer-direction ends of the vertical charge transfer paths. A floating diffusion portion 43 and a reset drain 44 are disposed on the side of a transfer-direction end of the horizontal charge transfer path 42. The amplifier 30 configured by transistors and diodes which are formed in the same semiconductor substrate as the solid-state imaging device chip is connected to the floating diffusion portion 43.

When the power supply is turned on, the amplifier 30 emits light. The influence due to the sensitization, i.e., the sensitization amount of each pixel (photodiode) is large in a portion encircled in the figure, or at positions which are closest to the amplifier 30, and small at positions which are remote therefrom.

In the case where the sensitization amount of each pixel due to the amplifier 30 is to be corrected, it is more appropriate to use a correction expression in which the pixel that is closest to the amplifier 30 is set as the origin. Therefore, the pixel coordinates of the corner portion which is encircled in the pixel portion (light receiving region) 41 is indicated by (xo, yo), an arbitrary position in the pixel portion 41 with respect to (xo, yo) is indicated by (x, y), and the position of the amplifier is set as the origin (0, 0).

In this case, the correction amount H(x, y) is indicated by Expression 1 below.

$$H(x, y) = \alpha / \{(xo+x)^2 + (yo+y)^2\} \quad \text{[Expression 1]}$$

where α is a predetermined number.

Figure 7:
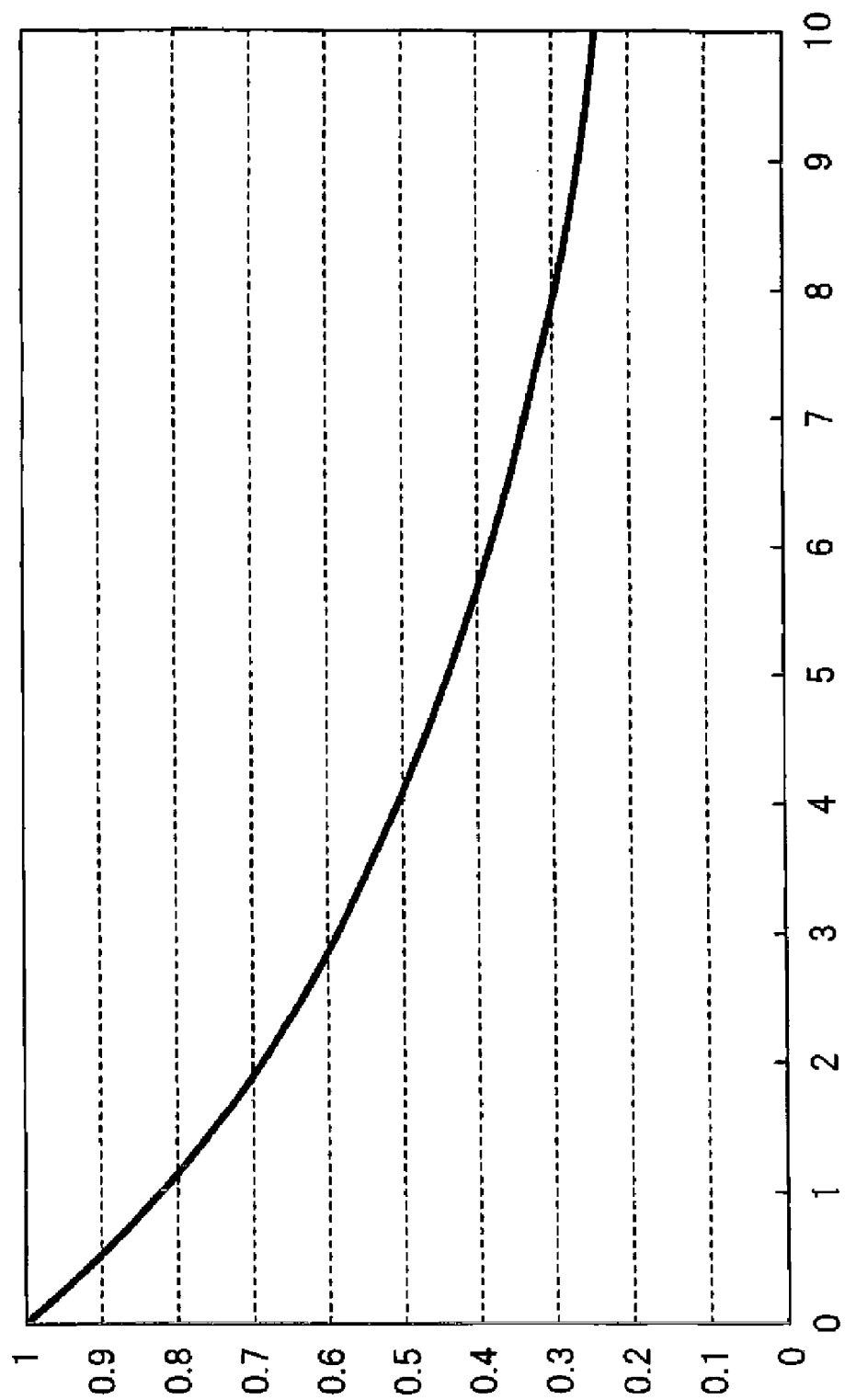
FIG. 7 is a graph showing an influence amount of the amplifier light emission in the solid-state imaging device shown in FIG. 6.

The correction amount is plotted in the form of a graph as shown in FIG. 7. FIG. 7 shows an example where α=100, (xo, yo)=(10, 0), y is fixed to 0 or y=0, and x is changed from 0 to 10. The graph shows a curve in which, as being further separated from the origin, the correction amount is gradually reduced.

In an actual solid-state imaging device, it is often that the ratio of the pixel number in the x direction (horizontal direction) to that in the y direction (vertical direction) is not 1:1. In addition to the case where the pixel pitches in the horizontal and vertical directions are not equal to each other, in the case where decimation reading is performed while ½ decimation, ⅓ decimation, or the like is conducted in the vertical direction, for example, the reading is performed while pixels in the vertical direction are decimated with respect to the horizontal direction.

In this case, with respect to the positional relationships of pixels to be read out from the amplifier, calculation of the number of horizontal pixels is different from that of the number of vertical pixels. When Expression 1 is applied as it is, an error occurs. In such a case, therefore, a correction expression of Expression 2 below is applied.

$$H(x, y) = \alpha / \{a(xo+x)^2 + b(yo+y)^2\} \quad \text{[Expression 2]}$$

where a and b are coefficients.

Figure 8:
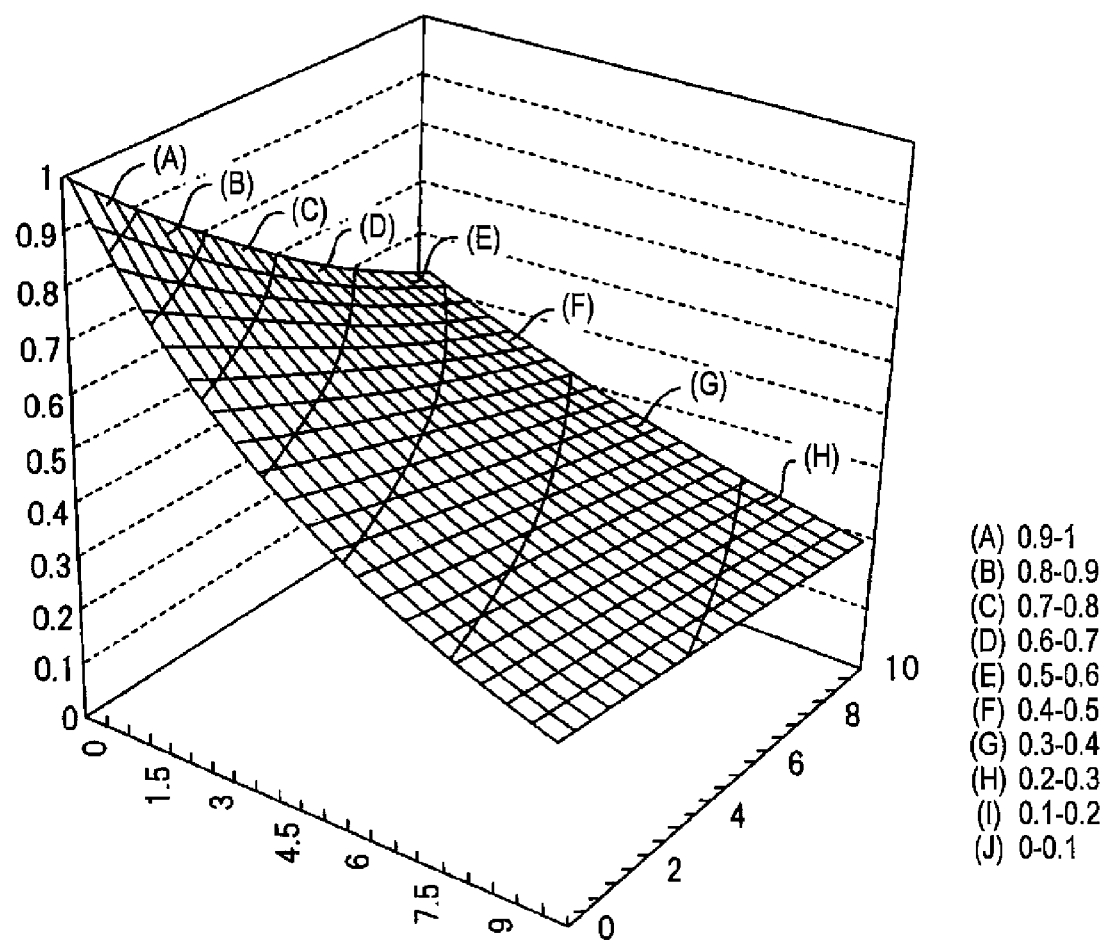
FIG. 8 is a graph showing a calculation example of the correction amount of amplifier sensitization (sensitization by light emission from amplifier).

When this correction expression is used, adequate correction is enabled, and high-quality object image data can be obtained. FIG. 8 is a view showing an example of the correction amount calculation using Expression 2. In the calculation, the values are set as follows: α=220, a=1.5, b=0.7, and (xo, yo)=(10, 10).

In the correction expressions of Expressions 1 and 2, also the detection signal of the pixel which is remotest from the amplifier 30 is a signal to be corrected. However, the influence of the light emission from amplifier on pixels which are separated to some extent from the amplifier 30 is small, and there is a case where correction is not necessary with respect to such pixels. Even when the region where the correction is performed is restricted, namely, there is no problem. In this case, a correction expression of Expression 3 below is used.

$$H(x, y) = [\alpha / \{a(xo+x)^2 + b(yo+y)^2\}] - \beta \quad \text{[Expression 3]}$$

where β is a predetermined number.

Figure 9:
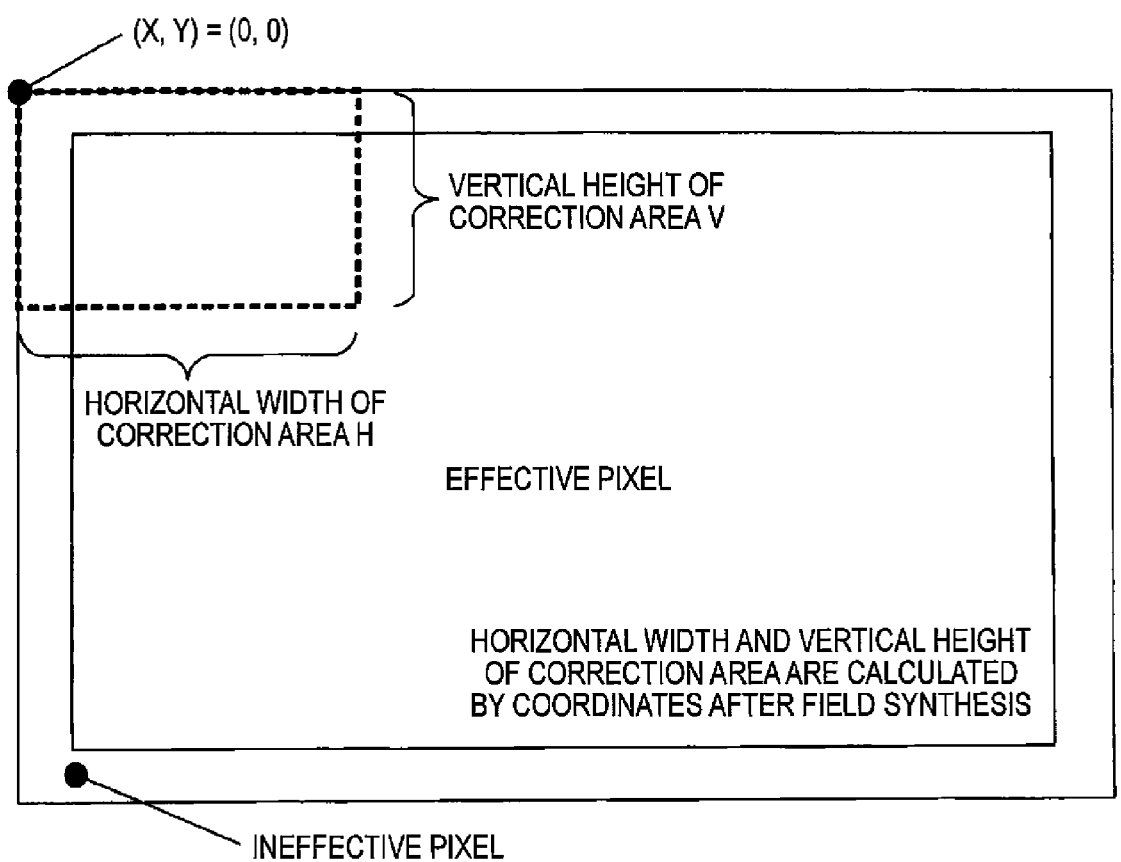
FIG. 9 is a diagram showing an example of restriction of an object region of the correction of amplifier sensitization.

FIG. 9 is a diagram showing an example of a region to be corrected in the case where correction using Expression 3 is performed. Among picked-up image signals obtained from the light receiving region (effective pixel region), image signals in a region of a vertical height of V and a horizontal width of H from the origin coordinates (0, 0) are corrected, and correction amounts with respect to those in the other region are set to zero (0). As a result, the processing time of the correction calculating process can be shortened.

Figure 10:
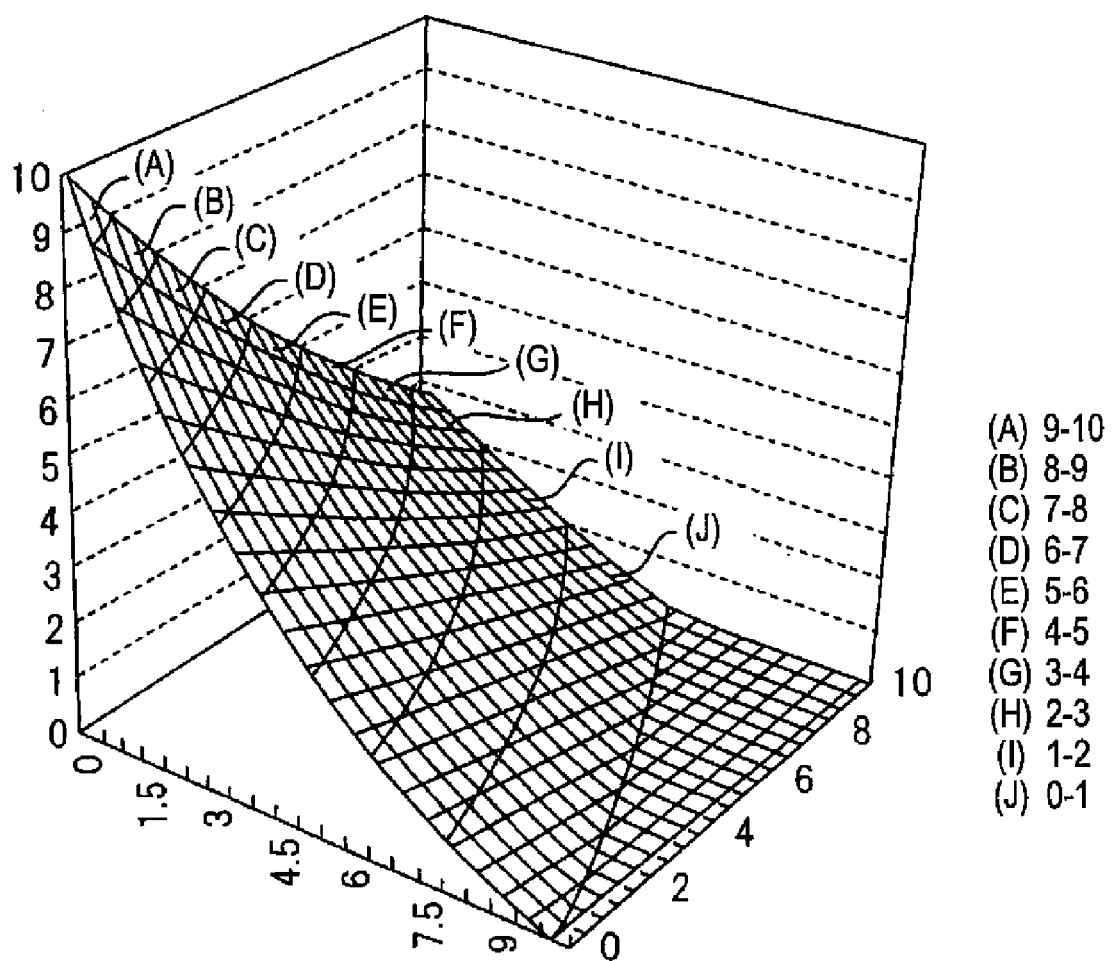
FIG. 10 is a graph showing another calculation example of the correction amount of amplifier sensitization.

FIG. 10 is a view showing an example of actual correction amount calculation, and illustrating a graph which is obtained by setting the values of Expression 3 as follows: α=3,300, β=5, a=1.5, b=0.7, and (xo, yo)=(10, 10). A portion which is calculated as a value that is equal to or smaller than 0 is clipped to 0, whereby correction by subtraction can be adequately performed without causing excessive correction, and this correction processing method can be easily introduced.

Figure 11:
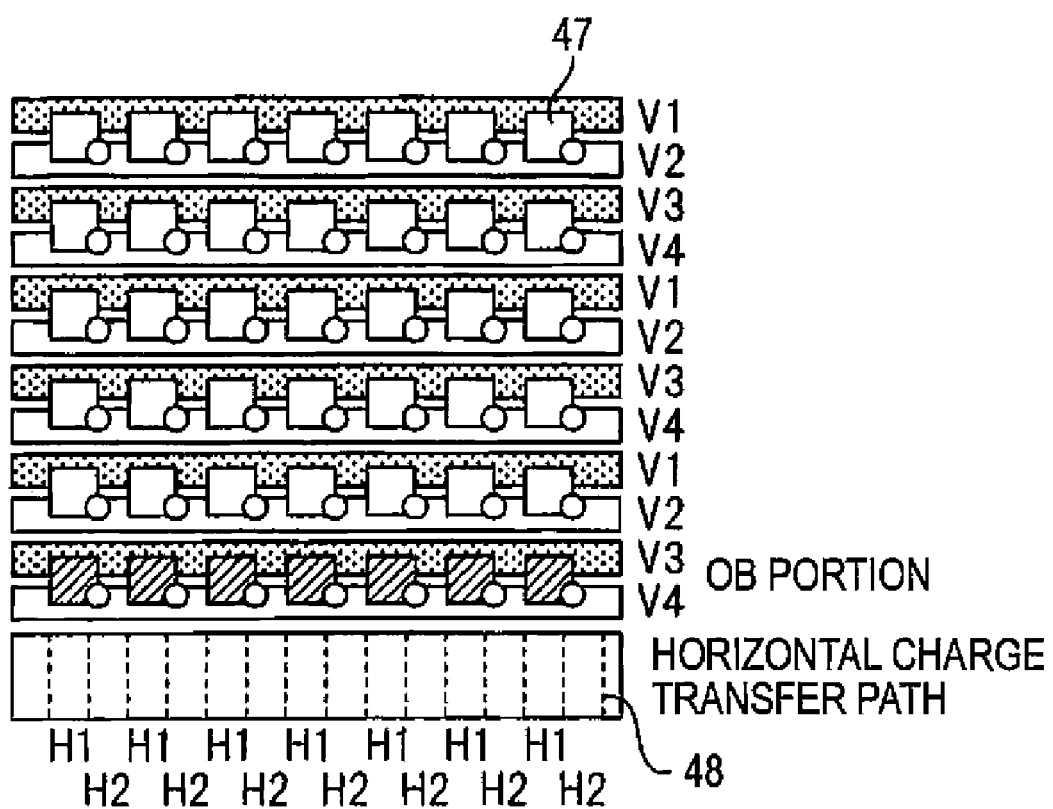
FIG. 11 is a diagram of a CCD solid-state imaging device in which interlaced reading is performed.

FIG. 11 is a diagram of a CCD solid-state imaging device in which interlaced reading (field reading) is performed. In FIG. 11, vertical charge transfer paths are not shown. A plurality of photodiodes (pixels) 47 are arranged in a two-dimensional array form, and vertical transfer electrode films V1, V2, . . . , V4 are laid in each pixel row.

An embedded channel (not shown) is formed along each pixel column. Vertical charge transfer paths are formed by the embedded channels and the vertical transfer electrode films which are formed above the embedded channels through a gate insulating film. A horizontal charge transfer path 48 is formed along transfer direction end portions of the vertical charge transfer paths. The circular mark shown in the vicinity of the lower right portion of each of the pixels 47 indicates a read gate of the pixel.

In the thus configured CCD solid-state imaging device, as shown in FIG. 12, a read pulse is first applied in a first field to the vertical transfer electrodes V2 to read out signals charges from odd-row pixels, and the signal charges are output. In the next or second field, the read pulse is applied to the vertical transfer electrodes V4 to read out signals charges from even-row pixels, and the signal charges are output.

In this case, the amplifier (not shown) which is disposed in the transfer direction end portion of the horizontal charge transfer path 48 is powered on at the beginning of the operation of the solid-state imaging device, and starts the weak light emission. The exposure period due to the weak light emission is started at a timing when an electronic shutter is turned off. The period until a timing when the read pulse of the first field is applied is the amplifier emission exposure period of the odd-row pixels which are to be read out in the first field. The amplifier emission exposure period of the even-row pixels which are to be read out in the second field extends from the timing when an electronic shutter is turned off, to a timing when the read pulse of the second field is applied.

Figure 13B:
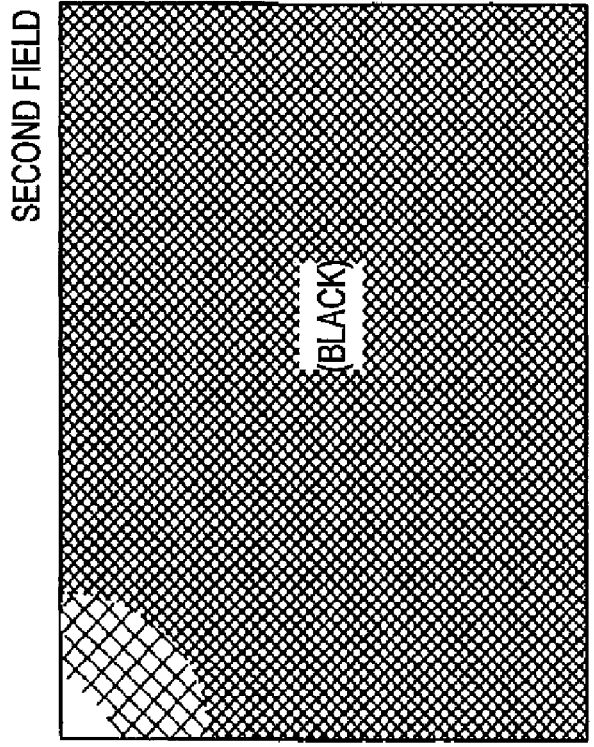
FIG. 13B is a diagram showing an example of amplifier sensitization in a second field.
Figure 13A:
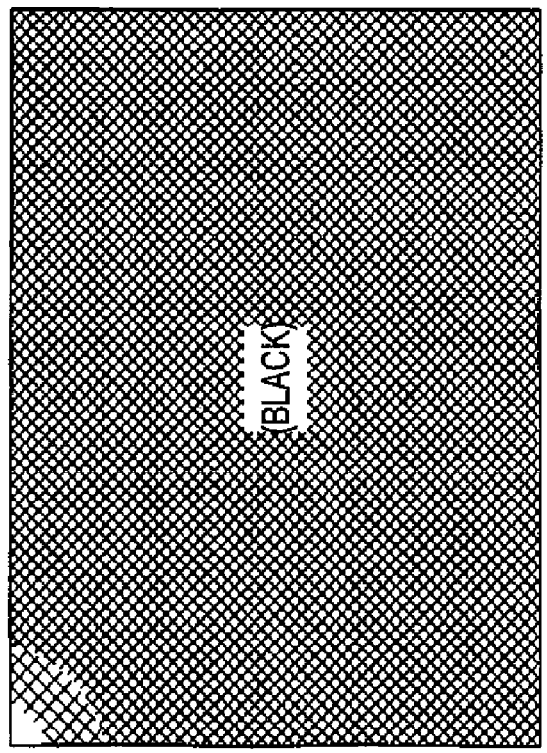
FIG. 13A is a diagram showing an example of amplifier sensitization in a first field of the CCD solid-state imaging device in which interlaced reading is performed.

Namely, the pixels which are to be read out in the second field are more influenced by the weak light emission than those which are to be read out in the first field. FIGS. 13A and 13B show an example of this phenomenon. In the picked-up image signals, level differences are produced between the odd-row pixels and the even-row pixels. When the picked-up image signals obtained in the two fields are corrected by the same correction amount, therefore, lateral streak noises appear. Therefore, the correction amount is changed for each field.

Figure 14A:
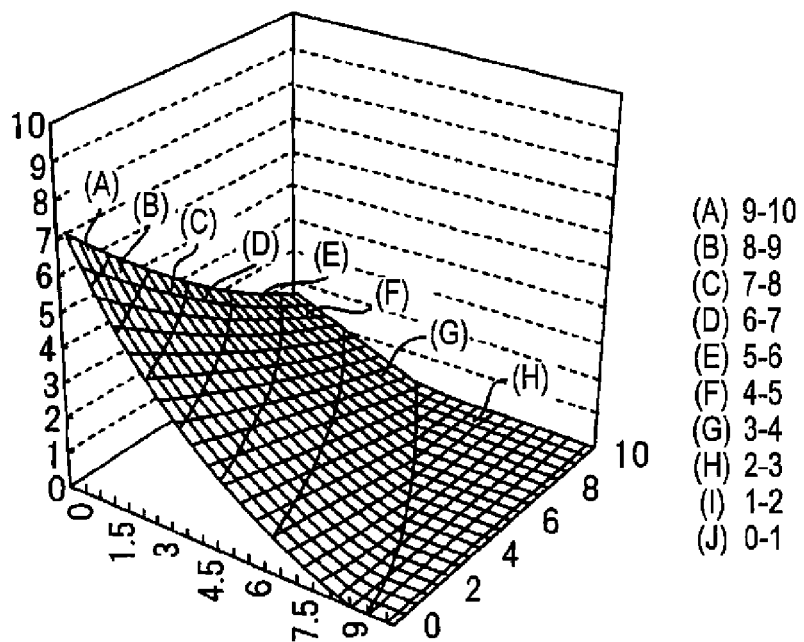
FIGS. 14A and 14B are graphs respectively showing correction amounts in the amplifier sensitization examples shown in FIGS. 13A and 13B.
Figure 14B:
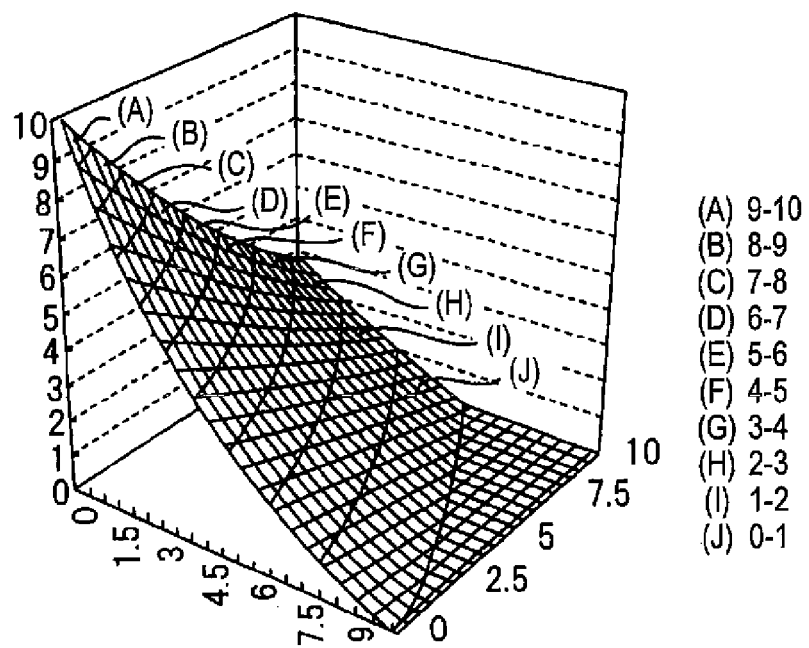

FIGS. 14A and 14B show graphs of calculation examples in which signals read out in the first field, and those read out in the second field are corrected by the correction expression of Expression 2. In this way, in a solid-state imaging device in which interlaced reading is performed, when the calculation parameters ($\alpha$, $\beta$, a, and b of Expressions 1, 2, and 3) of the correction amount is changed for each field, it is possible to produce high-quality object image data which are free from lateral streak noises.

In the above, the embodiment in which interlaced reading (two-field reading) is performed has been described. Of course, the invention may be similarly applied to a multi-field or three-field or more reading, and it is preferable to change the correction amount for each field.

Figure 15A:
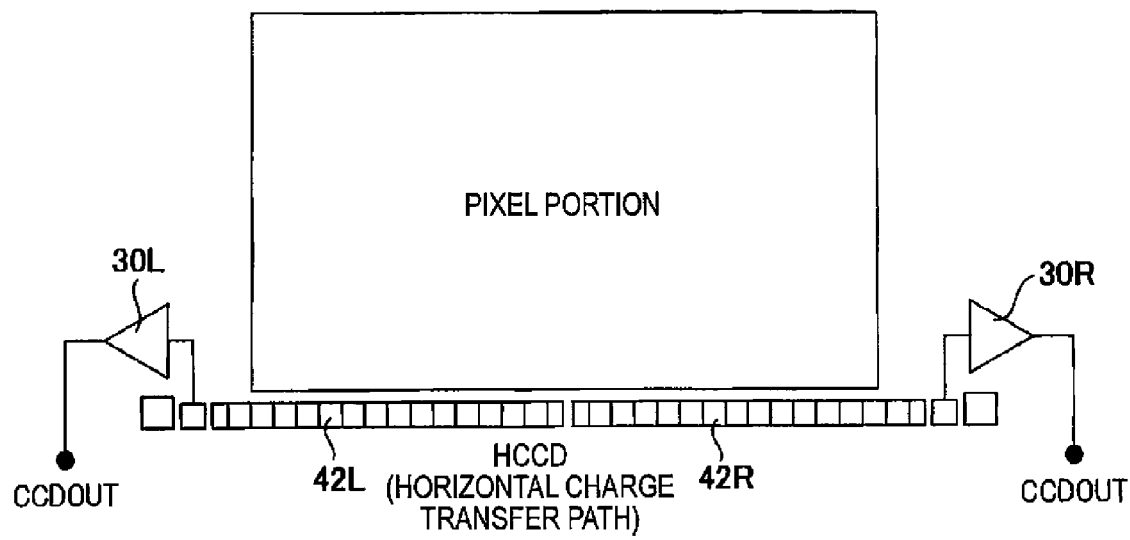
FIGS. 15A and 15B are diagrams of a CCD solid-state imaging device including a plurality of amplifiers.
Figure 15B:
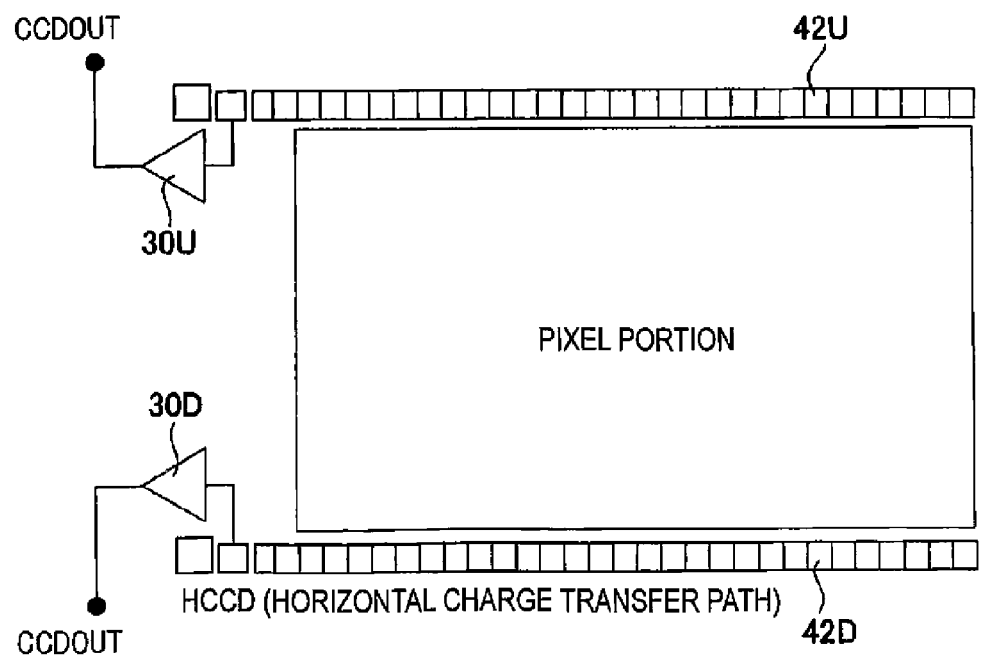

FIGS. 15A and 15B are diagrams of other embodiments of the CCD solid-state imaging device, respectively. In the solid-state imaging device of FIG. 15A, the horizontal charge transfer path for output is divided at the middle, an output amplifier 30L is disposed in the left horizontal charge transfer path 42L, and an output amplifier 30R is disposed in the right horizontal charge transfer path 42R.

In the solid-state imaging device of FIG. 15B, horizontal charge transfer paths 42U, 42D for output are disposed on the upper and lower sides of the pixel portion, and output amplifiers 30U, 30D are disposed in the paths, respectively.

Figure 16A:
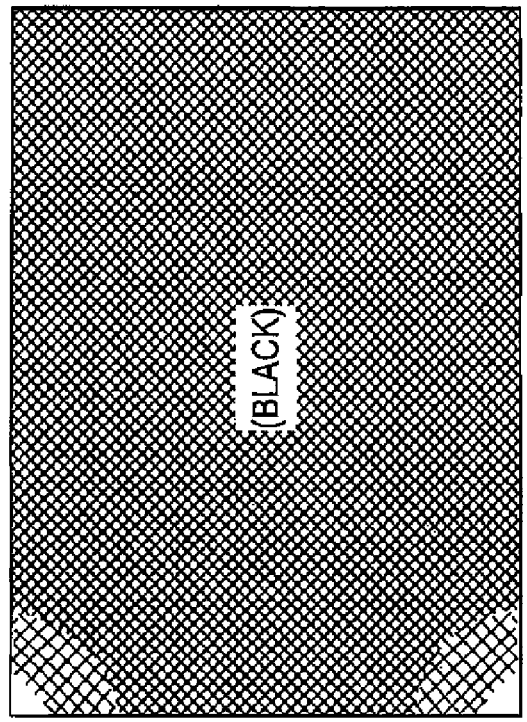
FIGS. 16A and 16B are diagrams respectively showing examples of amplifier sensitization in the CCD solid-state imaging device s shown in FIGS. 15A and 15B.
Figure 16B:
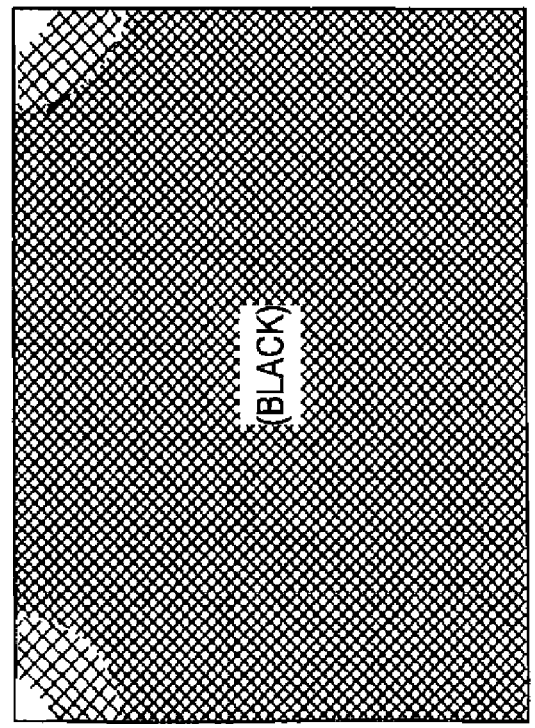

In these solid-state imaging devices, each of amplifiers emits weak light, and hence the pixels in the light receiving region receive weak light from the amplifiers to be exposed. FIGS. 16A and 16B show the manners of amplifier sensitization in the solid-state imaging devices of FIGS. 15A and 15B, respectively.

In a solid-state imaging device including a plurality of amplifiers, the correction amount of Expression 1 (or Expression 2 or 3) is calculated for each of the amplifiers, and a result of addition of the calculated results is subtracted from the picked-up image signals output from the solid-state imaging device, thereby performing correction.

In the illustrated examples, each of the devices includes the two amplifiers. The invention may be similarly applied to a solid-state imaging device including three or more amplifiers. A correction amount may be obtained for each of the amplifiers, and a value obtained by adding together the correction amounts may be subtracted from the picked-up image signals.

Figure 17:
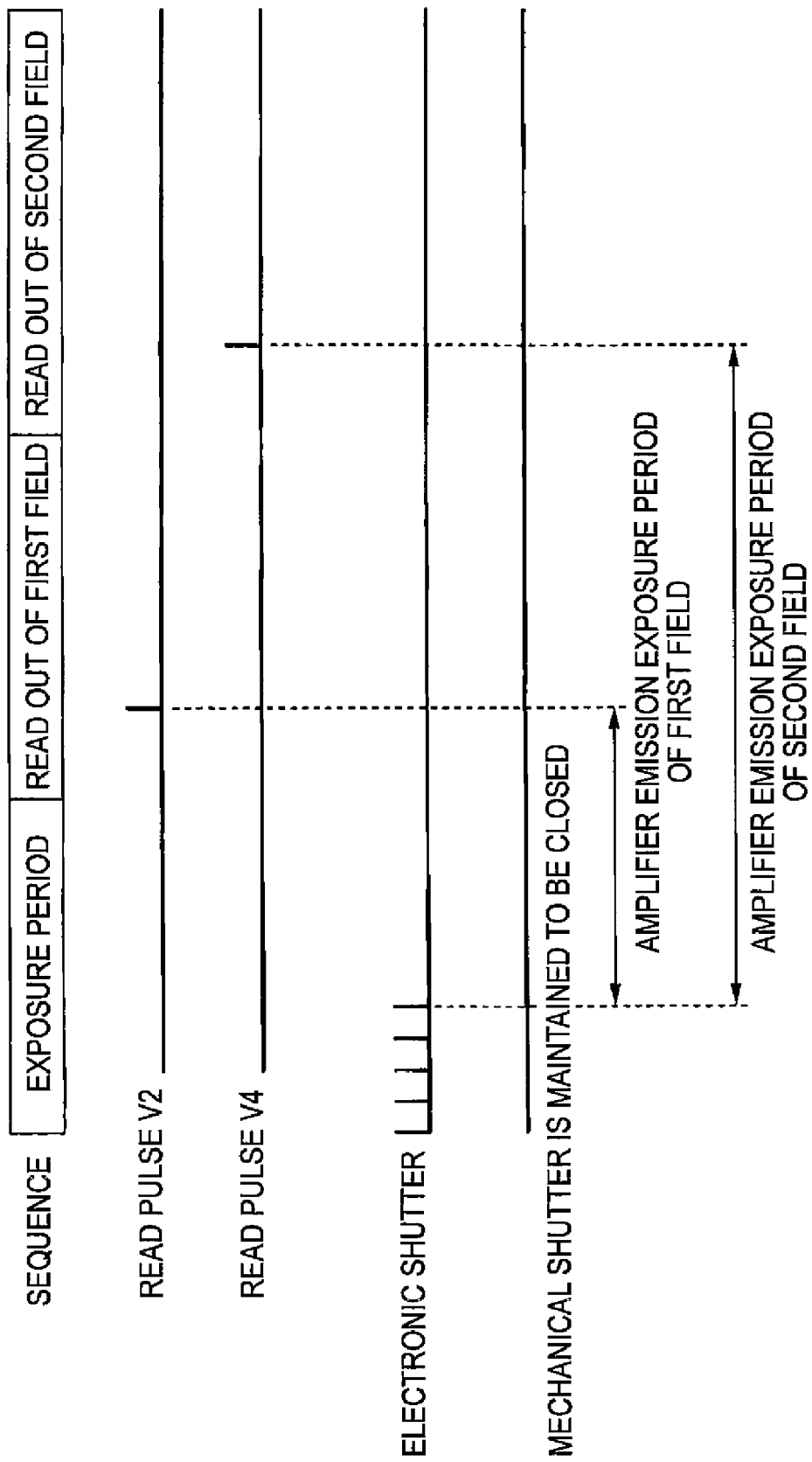
FIG. 17 is a timing chart of the case where the CCD solid-state imaging device in which interlaced reading is performed obtains light shielded image data.

FIG. 17 is a view illustrating a manner of calculating the calculation parameters of a correction amount for the light emission from amplifier (amplifier light emission). In the illustrated example, a solid-state imaging device in which interlaced reading is performed is used, and the solid-state imaging device is driven in a similar timing chart as that of FIG. 12. In this case, the device is driven while a mechanical shutter is maintained to be closed, whereby data of a light shielded image, i.e., data due to only the amplifier sensitization amount can be obtained.

When the values of $\alpha$, $\beta$, a, and b among the calculation parameters ($\alpha$, $\beta$, a, b, xo, and yo of Expressions 1, 2, and 3) of the correction amount for the amplifier sensitization amount are determined on the base of the light shielded image data which are obtained in this way, it is possible to obtain high-quality object image data.

Figure 18:
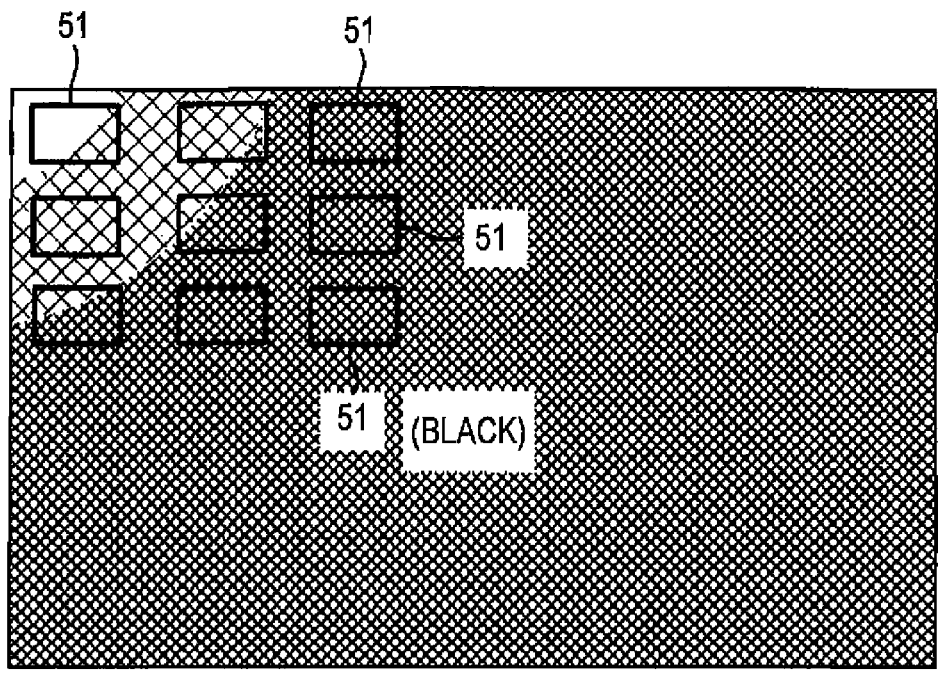
FIG. 18 is a view showing a region where data for determining parameter values in amplifier sensitization amount correction are to be obtained.

FIG. 18 is a view showing an example of obtaining the light shielded image data for determining the correction amount calculation parameters. In the example shown in FIG. 18, a region 51 of 3×3=9 is set in places where the amplifier sensitization amount is large, an integration amount of the light shielded image data of the region 51 is obtained, and the correction amount calculation parameters are determined.

Figure 19:
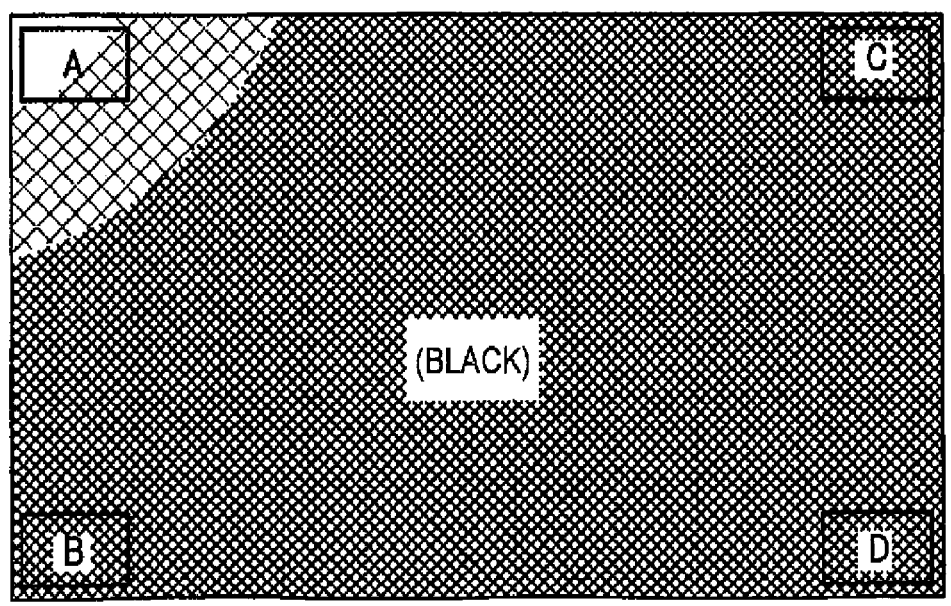
FIG. 19 is a view showing a region which is different from that of FIG. 18.
Figure 20:
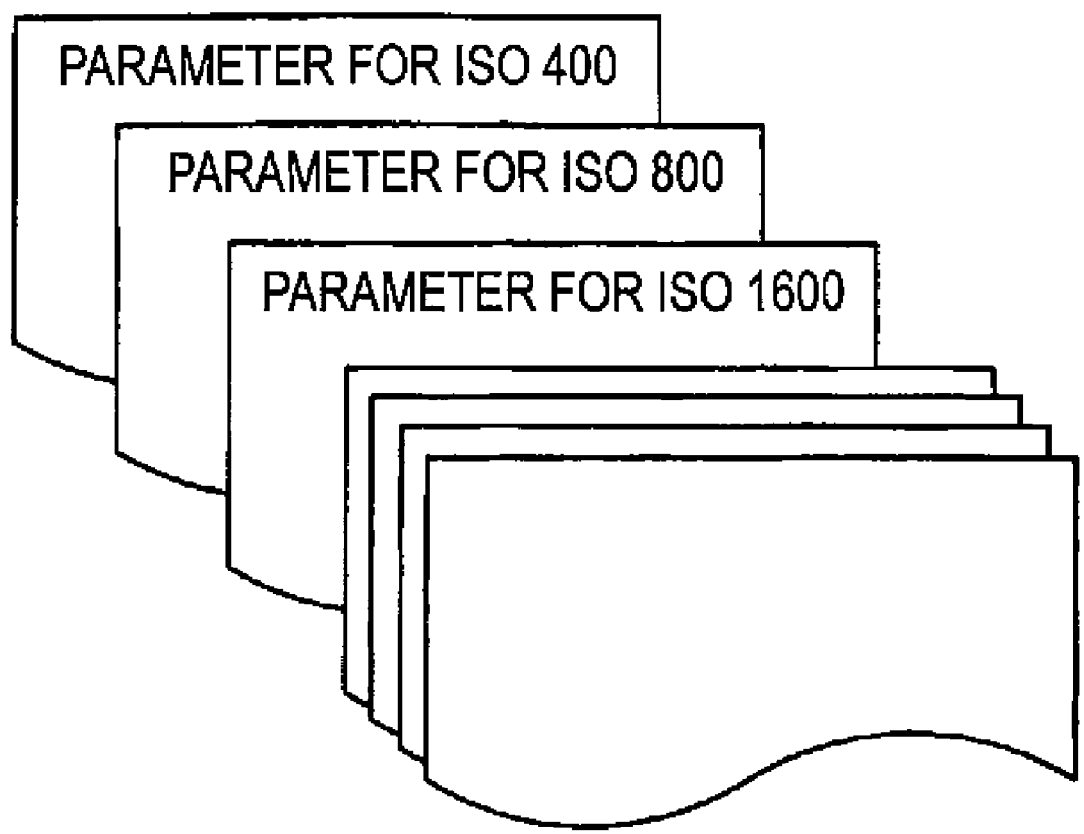
FIG. 20 is a view illustrating an example where the amplifier sensitization amount correction is performed for each ISO sensitivity.

In an example shown in FIG. 19, in a light receiving region of a solid-state imaging device, integration amounts (or average values) of light shielded image data of a region A which is in the corner closest to the amplifier, a region B which is in the corner in the vertical direction with respect to the region A, a region C which is in the corner in the horizontal direction with respect to the region A, and a region D which is in the corner that is diagonal to the region A may be obtained, and the correction amount calculation parameters may be determined from these amounts.

In FIG. 19, in the case where average pixel values of the regions A, B, C, D are A, B, C, and D, S=(A−B)−(C−D) is calculated, whereby dark shadings (vertical shading, horizontal shading) due to a dark current of the solid-state imaging device can be easily removed. Therefore, it is possible to accurate calculate only the amplifier light emission amount.

FIGS. 18 and 19 show the methods of determining the correction amount calculation parameters in a solid-state imaging device including one amplifier. In the case of a solid-state imaging device including a plurality of amplifiers as shown in FIGS. 15A and 15B, when the power supplies of the amplifiers are turned on one by one, the methods described with reference to FIGS. 18 and 19 can be applied as they are.

In the image pickup apparatus of the embodiment of the invention, the values of the above-described correction amount calculation parameters are determined for each ISO sensitivity, correction amount calculation parameters to be used are determined in accordance with the ISO sensitivity which is set in the image pickup apparatus, based on an amplifier sensitization amount correction program which will be described later, a correction amount H(x, y) with respect to the amplifier sensitization amount is obtained, and picked-up image data are corrected by the correction amount.

When an object image is picked up by the image pickup apparatus shown in FIG. 1, picked-up image signals are output from the pixels of the solid-state imaging device 2, the image signal processing circuit 10 image-process the picked-up image signals to produce, for example, MPEG motion picture data, and the data are stored into the recording medium 16.

At this time, the CPU 9 reads out the values of correction amount calculation parameters for each ISO sensitivity, and performs correction with respect to the amplifier sensitization on the basis of Expression 1 (or Expression 2 or 3), to removes influences of the amplifier sensitization amount.

Figure 21:
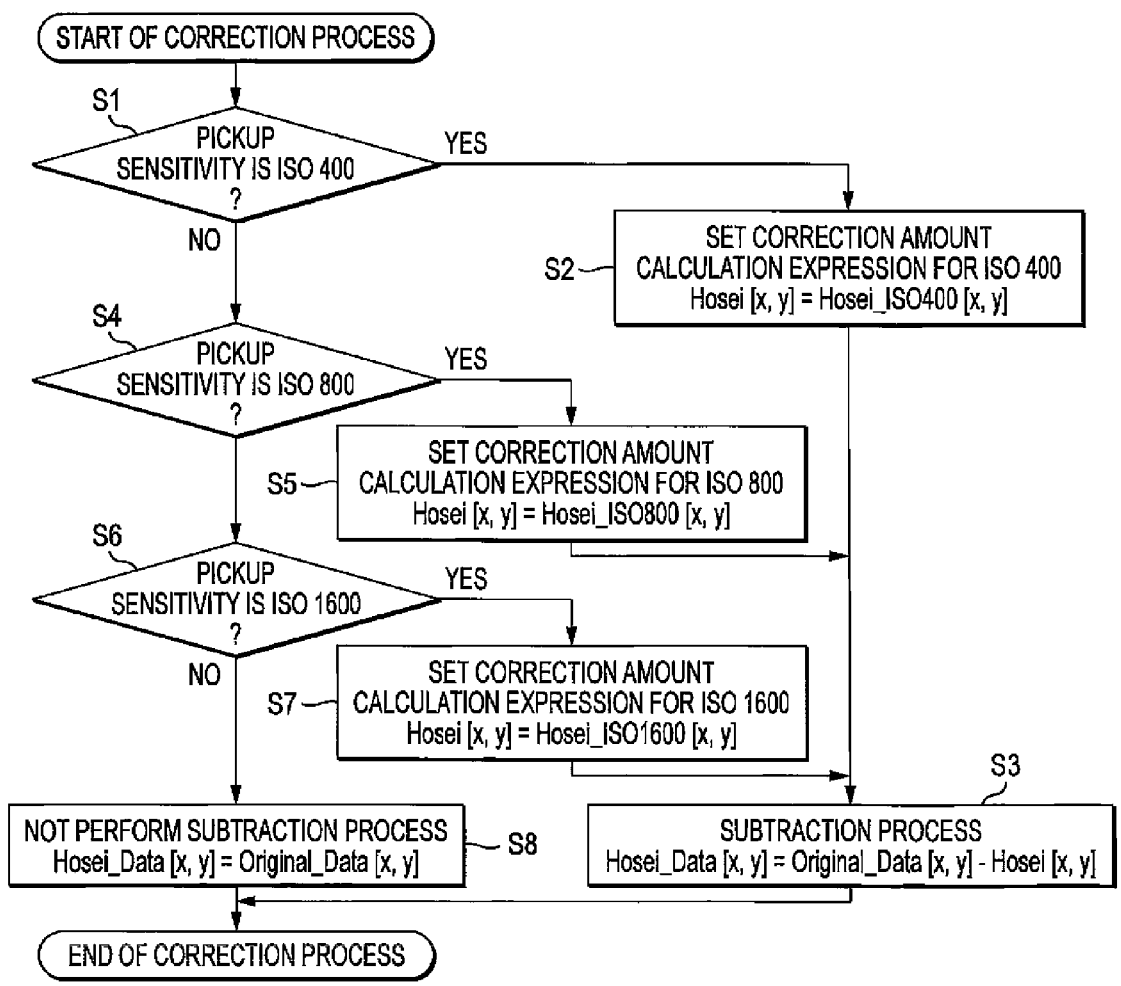
FIG. 21 is a flowchart showing a correction process procedure in which the amplifier sensitization amount correction is performed for each ISO sensitivity.

FIG. 21 is a flowchart showing the process procedure of the amplifier sensitization amount correction program. When the correction process is started, it is first determined whether the pickup sensitivity is ISO 400 or not (step S1). If the pickup sensitivity is ISO 400, the process proceeds to step S2 to calculate the correction amount H(x, y) while setting the parameters (α, β, a, b) of the correction amount calculation expression to the values for ISO 400. The calculated correction amount H(x, y) is subtracted from the picked-up image signal (step S3), and the correction process is ended.

If, as a result of the determination in step S1, the pickup sensitivity is not ISO 400, the process proceeds to step S4 to determine whether the pickup sensitivity is ISO 800 or not. If the pickup sensitivity is ISO 800, the process proceeds to step S5 to calculate the correction amount H(x, y) while setting the parameters (α, β, a, b) of the correction amount calculation expression to the values for ISO 800. The calculated correction amount H(x, y) is subtracted from the picked-up image signal (step S3), and the correction process is ended.

If, as a result of the determination in step S4, the pickup sensitivity is not ISO 800, the process proceeds to step S6 to determine whether the pickup sensitivity is ISO 1600 or not. If the pickup sensitivity is ISO 1600, the process proceeds to step S7 to calculate the correction amount H(x, y) while setting the parameters (α, β, a, b) of the correction amount calculation expression to the values for ISO 1600. The calculated correction amount H(x, y) is subtracted from the picked-up image signal (step S3), and the correction process is ended.

If, as a result of the determination in step S6, the pickup sensitivity is not ISO 1600, the process proceeds to step S8 because the upper limit of the pickup sensitivity of the image pickup apparatus is 1,600. The process of subtracting the correction amount in the correction process is not performed, and the correction process is ended.

When the correction process is performed as described above, the amplifier sensitization amount correction according to the ISO sensitivity is enabled, and a high-quality object image can be picked up irrespective of the pickup sensitivity.

Figure 22A:
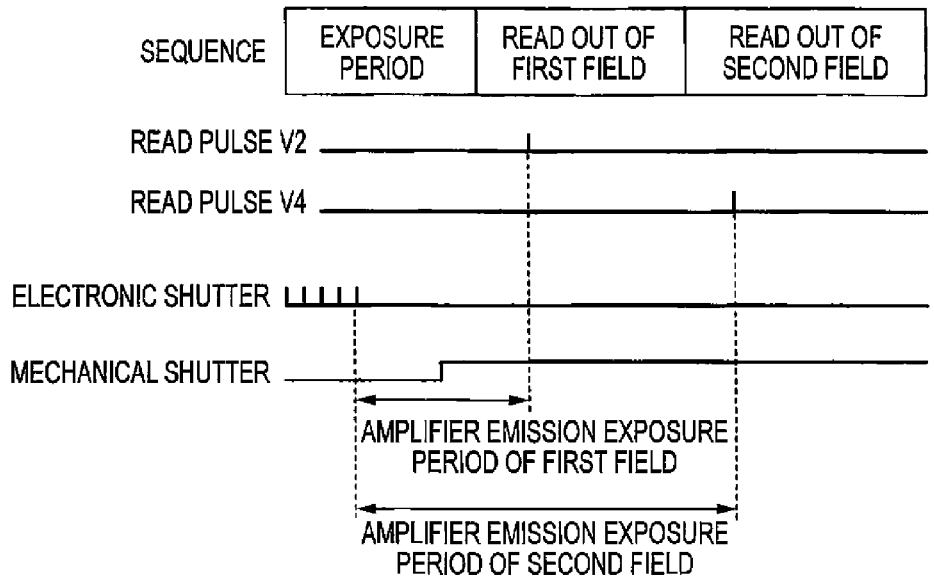
FIGS. 22A and 22B are timing charts of interlaced reading in the case where the exposure period is different for each picking up.
Figure 22B:
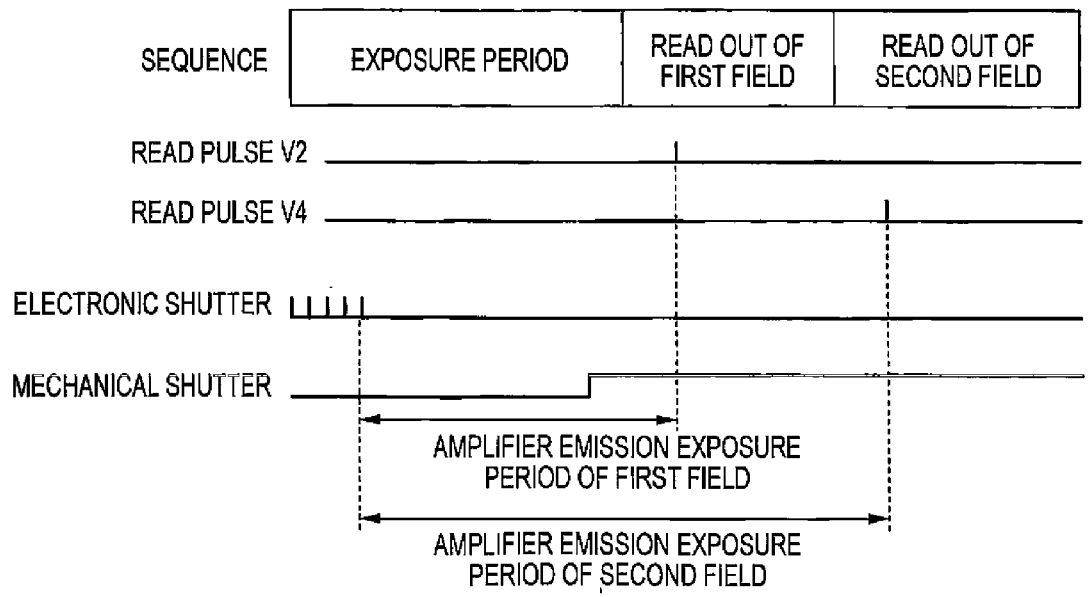

FIGS. 22A and 22B are views showing examples where a solid-state imaging device in which interlaced reading is performed is used, and the exposure period is different for each picking up. The difference between the amplifier emission exposure periods of the first and second fields can be eliminated by the embodiment of FIG. 12. When the exposure period is different for each picking up, however, a difference in the amplifier emission exposure period is produced between the first and second fields. In this case, preferably, the values of the amplifier sensitization amount correction parameters are finely adjusted for each picking up. The amount of the fine adjustment may be determined by previously obtaining the light shielded image data, or by obtaining the values in the first field which is used as the reference, by means of the proportional calculation.

Figure 23:
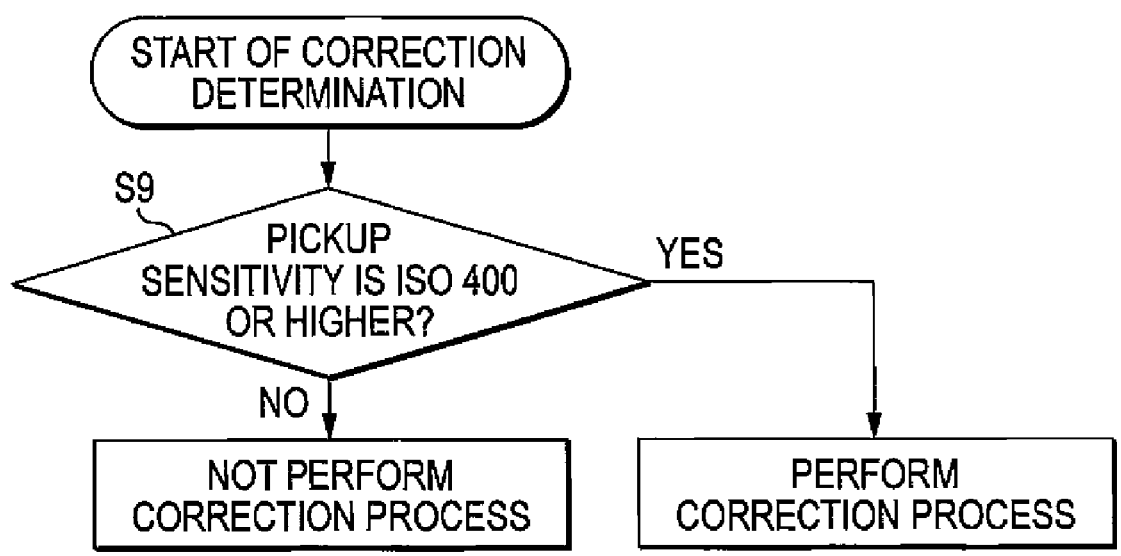
FIG. 23 is a flowchart showing a process procedure determining whether or not the amplifier sensitization amount correction is performed with respect to an ISO sensitivity.

In the embodiment of FIG. 21, the amplifier sensitization amount correction is performed with respect to ISO 400, 800, or 1600, and not performed with respect to ISO 100 or 200. Also in the case of ISO 100 or 200, the processes of steps S1, S4, and S6 are implemented, and therefore the calculation process is uselessly performed. Therefore, the followings may be performed. As shown in FIG. 23, it is initially determined whether the pickup sensitivity is ISO 400 or higher or not (step S9). If the determination result is affirmative, the process proceeds to step S1 of FIG. 21, and, if the determination result is negative, the correction process of FIG. 21 is not performed.

In the above, the embodiment where the amplifier sensitization amount correction is not performed with respect to ISO 100 or 200 has been described. This is because, in the case of the pickup sensitivity of ISO 100 or 200, the signal charge amount is originally large, and, even when the noise charge amount is minutely increased by the amplifier sensitization, the increase exerts little influence on the picked-up image signal. It is a matter of course that the amplifier sensitization amount correction may be performed with respect to ISO 100 or 200.

In the image pickup apparatus of the invention, also noises due to the amplifier sensitization in a high-sensitivity pickup mode can be reduced. Therefore, the image pickup apparatus is useful in application to a digital camera having a function of picking up a motion picture, or the like.

Although the invention has been described above in relation to preferred embodiments and modifications thereof, it will be understood by those skilled in the art that other variations and modifications can be effected in these preferred embodiments without departing from the scope and spirit of the invention.

What is claimed is:

1. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier; the method comprising:

for each of said plurality of pixels senses light emission produced when said amplifier operates, obtaining through said semiconductor substrate a signal amount as a correction amount, and subtracting the correction amount from a detection signal amount of a pixel which is output from said amplifier, to correct the detection signal amount, wherein the correction amount is obtained as a value dependent on a distance between said amplifier and said pixel, and wherein the correction amount is obtained as a value which is inversely proportional to a square of the distance between said amplifier and said pixel.

2. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier, the method comprising:

for each of said plurality of pixels senses light emission produced when said amplifier operates, obtaining through said semiconductor substrate a signal amount as a correction amount, and subtracting the correction amount from a detection signal amount of a pixel which is output from said amplifier, to correct the detection signal amount, wherein the correction amount is obtained as a value dependent on a distance between said amplifier and said pixel, and wherein, among said plurality of pixels, a pixel which is closest to said amplifier is set as an origin (xo, yo), and the correction amount H(x, y) of another pixel (x, y) with respect to the origin is obtained by $$H(x, y) = \alpha / \{(xo+x)^2 + (yo+y)^2\}$$

where α is a parameter value.

3. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier, the method comprising:

for each of said plurality of pixels senses light emission produced when said amplifier operates, obtaining through said semiconductor substrate a signal amount as a correction amount, and subtracting the correction amount from a detection signal amount of a pixel which is output from said amplifier, to correct the detection signal amount, wherein the correction amount is obtained as a value dependent on a distance between said amplifier and said pixel, and wherein, among said plurality of pixels, a pixel which is closest to said amplifier is set as an origin (xo, yo), and the correction amount H(x, y) of another pixel (x, y) with respect to the origin is obtained by $$H(x, y) = \alpha/\{a(xo+x)^2 + b(yo+y)^2\}$$

where $\alpha$, a, and b are parameter values.

4. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier, the method comprising:

for each of said plurality of pixels senses light emission produced when said amplifier operates, obtaining through said semiconductor substrate a signal amount as a correction amount, and subtracting the correction amount from a detection signal amount of a pixel which is output from said amplifier, to correct the detection signal amount, wherein the correction amount is obtained as a value dependent on a distance between said amplifier and said pixel, and wherein, among said plurality of pixels, a pixel which is closest to said amplifier is set as an origin (xo, yo), and the correction amount H(x, y) of another pixel (x, y) with respect to the origin is obtained by $$H(x, y) = [\alpha/\{a(xo+x)^2 + b(yo+y)^2\}] - \beta$$

where $\alpha$, $\beta$, a, and b are parameter values.

5. The method for correcting a picked-up image signal of an image pickup apparatus according to claim 1, wherein, among said plurality of pixels, a pixel which is closest to said amplifier is set as an origin (xo, yo), and the correction amount H(x, y) of another pixel (x, y) with respect to the origin is obtained by $$H(x, y) = [\alpha/\{a(xo+x)^2 + b(yo+y)^2\}] - \beta$$

where $\alpha$, $\beta$, a, and b are parameter values, and
wherein, when the correction amount has a minus value, the correction amount is set to zero.

6. The method for correcting a picked-up image signal of an image pickup apparatus according to claim 1, wherein, in the solid-state imaging device in which a multi-field reading is performed, the correction amount is obtained for each field.

7. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier; the method comprising:

for each of said plurality of pixels senses light emission produced when said amplifier operates, obtaining through said semiconductor substrate to obtain a signal amount as a correction amount, and subtracting the correction amount from a detection signal amount of a pixel which is output from said amplifier, to correct the detection signal amount, wherein, in the solid-state imaging device in which a multi-field reading is performed, the correction amount is obtained for each field and wherein the correction amount is obtained in accordance with a time for light emission from the amplifier which is different for each field.

8. The method for correcting a picked-up image signal of an image pickup apparatus according to claim 1, wherein, in a solid-state imaging device in which a plurality of amplifiers exist, the correction amount is obtained for each of said amplifiers, and a value which is obtained by adding together the correction amounts for said amplifiers is subtracted from detection signal amounts of said pixels.

9. The method for correcting a picked-up image signal of an image pickup apparatus according to claim 1, wherein the correction amount is calculated on the basis of a value which is obtained while operating said amplifier in a state where light is blocked from being incident on said plurality of pixels.

10. The method for correcting a picked-up image signal of an image pickup apparatus according to claim 1, wherein, among said plurality of pixels, a pixel which is closest to said amplifier is set as an origin (xo, yo), and the correction amount H(x, y) of another pixel (x, y) with respect to the origin is obtained by $$H(x, y) = [\alpha/\{a(xo+x)^2 + b(yo+y)^2\}] - \beta$$

where a is a parameter value, and
wherein the parameter value is determined on the basis of data of a light shielded image which is obtained while operating said amplifier in a state where light is blocked from being incident on said pixels, and the correction amount H(x, y) is calculated on the basis of the parameter value.

11. The method for correcting a picked-up image signal of an image pickup apparatus according to claim 10, wherein the parameter value is obtained by using an integration value of arbitrary plural regions among light shielded image data.

12. The method for correcting a picked-up image signal of an image pickup apparatus according to claim 11, wherein, a first region which is closest to said amplifier, a second region which is remotest in a vertical direction with respect said first region, a third region which is remotest in a horizontal direction with respect said first region, and a fourth region which is remotest in a diagonal direction with respect said first region are used.

13. The method for correcting a picked-up image signal of an image pickup apparatus according to claim 12, wherein, when an average value of the light shielded image data in the first region is A, the average value in the second region is B, the average value in the third region is C, and the average value in the fourth region is D, (A−B)−(C−D) is used in calculation of the parameter value.

14. The method for correcting a picked-up image signal of an image pickup apparatus according to claim 10, wherein, in a solid-state imaging device in which a plurality of amplifiers exist, a light shielded image data is obtained for each of said amplifiers by turning on power supplies of said amplifiers one by one.

15. The method for correcting a picked-up image signal of an image pickup apparatus according to claim 1, wherein the correction amount is obtained for each pickup sensitivity.

16. The method for correcting a picked-up image signal of an image pickup apparatus according to claim 15, wherein the correction amount is adjusted in accordance with an exposure time.

17. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier; the method comprising:
for each of said plurality of pixels senses light emission produced when said amplifier operates,
obtaining through said semiconductor substrate to obtain a signal amount as a correction amount, and
subtracting the correction amount from a detection signal amount of a pixel which is output from said amplifier, to correct the detection signal amount, wherein the correction amount is obtained for each pickup sensitivity, and wherein, when a pickup sensitivity is equal to or higher than a predetermined sensitivity, the correction amount is obtained, and, when the pickup sensitivity is lower than the predetermined sensitivity, the correction amount is set to zero,
wherein the correction amount is obtained as a value which is inversely proportional to a square of the distance between said amplifier and said pixel.

18. An image pickup apparatus comprising:
a solid-state imaging device comprising: a plurality of pixels which are arranged in a two-dimensional array provided in a surface portion of a semiconductor substrate, and an amplifier which is provided at said semiconductor substrate, and which amplifies signals that are detected by said plurality of pixels in accordance with an amount of incident light, wherein each of said plurality of pixels senses light emission produced when said amplifier operates, through said semiconductor substrate to obtain a signal amount as a correction amount;
an image signal processing section which processes a signal output from said amplifier; and
a correcting section which subtracts the correction amount from a detection signal amount of a pixel which is output from said amplifier, to correct the detection signal amount, wherein the correction amount is obtained as a value dependent on a distance between said amplifier and said pixel,
wherein the correction amount is obtained as a value which is inversely proportional to a square of the distance between said amplifier and said pixel.

19. The method for correcting a picked-up image signal of an image pickup apparatus according to claim 2, wherein the correction amount is obtained as a value which is inversely proportional to a square of the distance between said amplifier and said pixel.

20. The method for correcting a picked-up image signal of an image pickup apparatus according to claim 2, wherein, in the solid-state imaging device in which a multi-field reading is performed, the correction amount is obtained for each field.

21. The method for correcting a picked-up image signal of an image pickup apparatus according to claim 2, wherein, in a solid-state imaging device in which a plurality of amplifiers exist, the correction amount is obtained for each of said amplifiers, and a value which is obtained by adding together the correction amounts for said amplifiers is subtracted from detection signal amounts of said pixels.

22. The method for correcting a picked-up image signal of an image pickup apparatus according to claim 2, wherein the correction amount is calculated on the basis of a value which is obtained while operating said amplifier in a state where light is blocked from being incident on said plurality of pixels.

23. The method for correcting a picked-up image signal of an image pickup apparatus according to claim 2, wherein the parameter value is determined on the basis of data of a light shielded image which is obtained while operating said amplifier in a state where light is blocked from being incident on said pixels, and the correction amount H(x, y) is calculated on the basis of the parameter value.

24. The method for correcting a picked-up image signal of an image pickup apparatus according to claim 23, wherein the parameter value is obtained by using an integration value of arbitrary plural regions among light shielded image data.

25. The method for correcting a picked-up image signal of an image pickup apparatus according to claim 24, wherein, in a plurality of regions, a first region which is closest to said amplifier, a second region which is remotest in a vertical direction with respect said first region, a third region which is remotest in a horizontal direction with respect said first region, and a fourth region which is remotest in a diagonal direction with respect said first region are used.

26. The method for correcting a picked-up image signal of an image pickup apparatus according to claim 25, wherein, when an average value of the light shielded image data in the first region is A, the average value in the second region is B, the average value in the third region is C, and the average value in the fourth region is D, (A−B)−(C−D) is used in calculation of the parameter value.

27. The method for correcting a picked-up image signal of an image pickup apparatus according to claim 23, wherein, in a solid-state imaging device in which a plurality of amplifiers exist, a light shielded image data is obtained for each of said amplifiers by turning on power supplies of said amplifiers one by one.

28. The method for correcting a picked-up image signal of an image pickup apparatus according to claim 2, wherein the correction amount is obtained for each pickup sensitivity.

29. The method for correcting a picked-up image signal of an image pickup apparatus according to claim 28, wherein the correction amount is adjusted in accordance with an exposure time.

30. The method for correcting a picked-up image signal of an image pickup apparatus according to claim 3, wherein the correction amount is obtained as a value which is inversely proportional to a square of the distance between said amplifier and said pixel.

31. The method for correcting a picked-up image signal of an image pickup apparatus according to claim 3, wherein, in the solid-state imaging device in which a multi-field reading is performed, the correction amount is obtained for each field.

32. The method for correcting a picked-up image signal of an image pickup apparatus according to claim 3, wherein, in a solid-state imaging device in which a plurality of amplifiers exist, the correction amount is obtained for each of said amplifiers, and a value which is obtained by adding together the correction amounts for said amplifiers is subtracted from detection signal amounts of said pixels.

33. The method for correcting a picked-up image signal of an image pickup apparatus according to claim 3, wherein the correction amount is calculated on the basis of a value which is obtained while operating said amplifier in a state where light is blocked from being incident on said plurality of pixels.

34. The method for correcting a picked-up image signal of an image pickup apparatus according to claim 3, wherein the parameter value is determined on the basis of data of a light shielded image which is obtained while operating said amplifier in a state where light is blocked from being incident on said pixels, and the correction amount H(x, y) is calculated on the basis of the parameter value.

35. The method for correcting a picked-up image signal of an image pickup apparatus according to claim 34, wherein the parameter value is obtained by using an integration value of arbitrary plural regions among light shielded image data.

36. The method for correcting a picked-up image signal of an image pickup apparatus according to claim 35, wherein, in a plurality of regions, a first region which is closest to said amplifier, a second region which is remotest in a vertical direction with respect said first region, a third region which is remotest in a horizontal direction with respect said first region, and a fourth region which is remotest in a diagonal direction with respect said first region are used.

37. The method for correcting a picked-up image signal of an image pickup apparatus according to claim 36, wherein, when an average value of the light shielded image data in the first region is A, the average value in the second region is B, the average value in the third region is C, and the average value in the fourth region is D, (A−B)−(C−D) is used in calculation of the parameter value.

38. The method for correcting a picked-up image signal of an image pickup apparatus according to claim 34, wherein, in a solid-state imaging device in which a plurality of amplifiers exist, a light shielded image data is obtained for each of said amplifiers by turning on power supplies of said amplifiers one by one.

39. The method for correcting a picked-up image signal of an image pickup apparatus according to claim 3, wherein the correction amount is obtained for each pickup sensitivity.

40. The method for correcting a picked-up image signal of an image pickup apparatus according to claim 39, wherein the correction amount is adjusted in accordance with an exposure time.

41. The method for correcting a picked-up image signal of an image pickup apparatus according to claim 4, wherein the correction amount is obtained as a value which is inversely proportional to a square of the distance between said amplifier and said pixel.

42. The method for correcting a picked-up image signal of an image pickup apparatus according to claim 4, wherein, in the solid-state imaging device in which a multi-field reading is performed, the correction amount is obtained for each field.

43. The method for correcting a picked-up image signal of an image pickup apparatus according to claim 4, wherein, in a solid-state imaging device in which a plurality of amplifiers exist, the correction amount is obtained for each of said amplifiers, and a value which is obtained by adding together the correction amounts for said amplifiers is subtracted from detection signal amounts of said pixels.

44. The method for correcting a picked-up image signal of an image pickup apparatus according to claim 4, wherein the correction amount is calculated on the basis of a value which is obtained while operating said amplifier in a state where light is blocked from being incident on said plurality of pixels.

45. The method for correcting a picked-up image signal of an image pickup apparatus according to claim 4, wherein the parameter value is determined on the basis of data of a light shielded image which is obtained while operating said amplifier in a state where light is blocked from being incident on said pixels, and the correction amount H(x, y) is calculated on the basis of the parameter value.

46. The method for correcting a picked-up image signal of an image pickup apparatus according to claim 45, wherein the parameter value is obtained by using an integration value of arbitrary plural regions among light shielded image data.

47. The method for correcting a picked-up image signal of an image pickup apparatus according to claim 46, wherein, in a plurality of regions, a first region which is closest to said amplifier, a second region which is remotest in a vertical direction with respect said first region, a third region which is remotest in a horizontal direction with respect said first region, and a fourth region which is remotest in a diagonal direction with respect said first region are used.

48. The method for correcting a picked-up image signal of an image pickup apparatus according to claim 47, wherein, when an average value of the light shielded image data in the first region is A, the average value in the second region is B, the average value in the third region is C, and the average value in the fourth region is D, (A−B)−(C−D) is used in calculation of the parameter value.

49. The method for correcting a picked-up image signal of an image pickup apparatus according to claim 45, wherein, in a solid-state imaging device in which a plurality of amplifiers exist, a light shielded image data is obtained for each of said amplifiers by turning on power supplies of said amplifiers one by one.

50. The method for correcting a picked-up image signal of an image pickup apparatus according to claim 4, wherein the correction amount is obtained for each pickup sensitivity.

51. The method for correcting a picked-up image signal of an image pickup apparatus according to claim 50, wherein the correction amount is adjusted in accordance with an exposure time.

52. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier, said method comprising:
  for each of said plurality of pixels senses light emission produced when said amplifier operates,
  obtaining through said semiconductor substrate a signal amount as a correction amount, and
  subtracting the correction amount from a detection signal amount of a pixel which is output from said amplifier, to correct the detection signal amount,
  wherein, in the solid-state imaging device in which a multi-field reading is performed, the correction amount is obtained for each field and wherein the correction amount is obtained in accordance with a time for light emission from the amplifier which is different for each field, wherein, among said plurality of pixels, a pixel which is closest to said amplifier is set as an origin (xo, yo), and the correction amount H(x, y) of another pixel (x, y) with respect to the origin is obtained by $$H(x, y)=[\alpha/\{a(xo+x)^2+b(yo+y)^2\}]-\beta$$

where α is a parameter value.

53. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier, said method comprising:

for each of said plurality of pixels senses light emission produced when said amplifier operates, obtaining through said semiconductor substrate a signal amount as a correction amount, and subtracting the correction amount from a detection signal amount of a pixel which is output from said amplifier, to correct the detection signal amount, wherein, in the solid-state imaging device in which a multi-field reading is performed, the correction amount is obtained for each field and wherein the correction amount is obtained in accordance with a time for light emission from the amplifier which is different for each field, wherein, among said plurality of pixels, a pixel which is closest to said amplifier is set as an origin (xo, yo), and the correction amount H(x, y) of another pixel (x, y) with respect to the origin is obtained by $$H(x, y)=[\alpha/\{a(xo+x)^2+b(yo+y)^2\}]-\beta$$

where α, a, and b are parameter values.

54. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier, said method comprising:

for each of said plurality of pixels senses light emission produced when said amplifier operates, obtaining through said semiconductor substrate a signal amount as a correction amount, and subtracting the correction amount from a detection signal amount of a pixel which is output from said amplifier, to correct the detection signal amount, wherein, in the solid-state imaging device in which a multi-field reading is performed, the correction amount is obtained for each field and wherein the correction amount is obtained in accordance with a time for light emission from the amplifier which is different for each field, wherein, among said plurality of pixels, a pixel which is closest to said amplifier is set as an origin (xo, yo), and the correction amount H(x, y) of another pixel (x, y) with respect to the origin is obtained by $$H(x, y)=[\alpha/\{a(xo+x)^2+b(yo+y)^2\}]-\beta$$

where α, a, and b are parameter values.

55. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier, said method comprising:

for each of said plurality of pixels senses light emission produced when said amplifier operates, obtaining through said semiconductor substrate a signal amount as a correction amount, and subtracting the correction amount from a detection signal amount of a pixel which is output from said amplifier, to correct the detection signal amount, wherein the correction amount is obtained for each pickup sensitivity, and wherein, when a pickup sensitivity is equal to or higher than a predetermined sensitivity, the correction amount is obtained, and, when the pickup sensitivity is lower than the predetermined sensitivity, the correction amount is set to zero, wherein, among said plurality of pixels, a pixel which is closest to said amplifier is set as an origin (xo, yo), and the correction amount H(x, y) of another pixel (x, y) with respect to the origin is obtained by $$H(x, y)=[\alpha/\{a(xo+x)^2+b(yo+y)^2\}]-\beta$$

where α is a parameter value.

56. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier, said method comprising:

for each of said plurality of pixels senses light emission produced when said amplifier operates, obtaining through said semiconductor substrate a signal amount as a correction amount, and subtracting the correction amount from a detection signal amount of a pixel which is output from said amplifier, to correct the detection signal amount, wherein the correction amount is obtained for each pickup sensitivity, and wherein, when a pickup sensitivity is equal to or higher than a predetermined sensitivity, the correction amount is obtained, and, when the pickup sensitivity is lower than the predetermined sensitivity, the correction amount is set to zero, wherein, among said plurality of pixels, a pixel which is closest to said amplifier is set as an origin (xo, yo), and the correction amount H(x, y) of another pixel (x, y) with respect to the origin is obtained by $$H(x, y)=[\alpha/\{a(xo+x)^2+b(yo+y)^2\}]-\beta$$

where α, a, and b are parameter values.

57. A method for correcting a picked-up image signal of an image pickup apparatus, said image pickup apparatus comprising: a solid-state imaging device comprising a plurality of pixels which are arranged in a two-dimensional array formed in a surface portion of a semiconductor substrate, and an amplifier which is provided at said semiconductor substrate, and which amplifies signals that are detected by said plurality of pixels in accordance with an amount of incident light; and an image signal processing section which processes a signal output from said amplifier, said method comprising:

for each of said plurality of pixels senses light emission produced when said amplifier operates, obtaining through said semiconductor substrate a signal amount as a correction amount, and subtracting the correction amount from a detection signal amount of a pixel which is output from said amplifier, to correct the detection signal amount, wherein the correction amount is obtained for each pickup sensitivity, and wherein, when a pickup sensitivity is equal to or higher than a predetermined sensitivity, the correction amount is obtained, and, when the pickup sensitivity is lower than the predetermined sensitivity, the correction amount is set to zero, wherein, among said plurality of pixels, a pixel which is closest to said amplifier is set as an origin (xo, yo), and the correction amount H(x, y) of another pixel (x, y) with respect to the origin is obtained by $$H(x, y) = [\alpha/\{a(xo+x)^2 + b(yo+y)^2\}] - \beta$$

where $\alpha$, $\beta$, a, and b are parameter values.

58. An image pickup apparatus comprising:
a solid-state imaging device comprising: a plurality of pixels which are arranged in a two-dimensional array provided in a surface portion of a semiconductor substrate, and an amplifier which is provided at said semiconductor substrate, and which amplifies signals that are detected by said plurality of pixels in accordance with an amount of incident light, wherein each of said plurality of pixels senses light emission produced when said amplifier operates, through said semiconductor substrate to obtain a signal amount as a correction amount;

an image signal processing section which processes a signal output from said amplifier; and a correcting section which subtracts the correction amount from a detection signal amount of a pixel which is output from said amplifier, to correct the detection signal amount, wherein the correction amount is obtained as a value dependent on a distance between said amplifier and said pixel, wherein, among said plurality of pixels, a pixel which is closest to said amplifier is set as an origin (xo, yo), and the correction amount H(x, y) of another pixel (x, y) with respect to the origin is obtained by $$H(x, y) = [\alpha/\{a(xo+x)^2 + b(yo+y)^2\}] - \beta$$

where $\alpha$ is a parameter value.

59. An image pickup apparatus comprising:
a solid-state imaging device comprising: a plurality of pixels which are arranged in a two-dimensional array provided in a surface portion of a semiconductor substrate, and an amplifier which is provided at said semiconductor substrate, and which amplifies signals that are detected by said plurality of pixels in accordance with an amount of incident light, wherein each of said plurality of pixels senses light emission produced when said amplifier operates, through said semiconductor substrate to obtain a signal amount as a correction amount;

an image signal processing section which processes a signal output from said amplifier; and a correcting section which subtracts the correction amount from a detection signal amount of a pixel which is output from said amplifier, to correct the detection signal amount, wherein the correction amount is obtained as a value dependent on a distance between said amplifier and said pixel, wherein, among said plurality of pixels, a pixel which is closest to said amplifier is set as an origin (xo, yo), and the correction amount H(x, y) of another pixel (x, y) with respect to the origin is obtained by $$H(x, y) = [\alpha/\{a(xo+x)^2 + b(yo+y)^2\}] - \beta$$

where $\alpha$, a, and b are parameter values.

60. An image pickup apparatus comprising:
a solid-state imaging device comprising: a plurality of pixels which are arranged in a two-dimensional array provided in a surface portion of a semiconductor substrate, and an amplifier which is provided at said semiconductor substrate, and which amplifies signals that are detected by said plurality of pixels in accordance with an amount of incident light, wherein each of said plurality of pixels senses light emission produced when said amplifier operates, through said semiconductor substrate to obtain a signal amount as a correction amount;

an image signal processing section which processes a signal output from said amplifier; and a correcting section which subtracts the correction amount from a detection signal amount of a pixel which is output from said amplifier, to correct the detection signal amount, wherein the correction amount is obtained as a value dependent on a distance between said amplifier and said pixel, wherein, among said plurality of pixels, a pixel which is closest to said amplifier is set as an origin (xo, yo), and the correction amount H(x, y) of another pixel (x, y) with respect to the origin is obtained by $$H(x, y) = [\alpha/\{a(xo+x)^2 + b(yo+y)^2\}] - \beta$$

where $\alpha$, $\beta$, a, and b are parameter values.

* * * * *